United States Patent
Zhou

(10) Patent No.: US 12,225,547 B2
(45) Date of Patent: Feb. 11, 2025

(54) METHOD FOR GENERATING A DOWNLINK CONTROL INFORMATION, METHOD FOR SCHEDULING A CELL, AND ELECTRONIC DEVICE

(71) Applicant: BEIJING UNISOC COMMUNICATIONS TECHNOLOGY CO., LTD., Beijing (CN)

(72) Inventor: Huan Zhou, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 387 days.

(21) Appl. No.: 17/861,170

(22) Filed: Jul. 9, 2022

(65) Prior Publication Data

US 2022/0353851 A1 Nov. 3, 2022

Related U.S. Application Data

(63) Continuation of application No. PCT/CN2021/075600, filed on Feb. 5, 2021.

(30) Foreign Application Priority Data

Jan. 10, 2020 (CN) .......................... 202010028277.0

(51) Int. Cl.
*H04W 72/23* (2023.01)
*H04W 72/0446* (2023.01)
*H04W 72/0453* (2023.01)

(52) U.S. Cl.
CPC ....... *H04W 72/23* (2023.01); *H04W 72/0446* (2013.01); *H04W 72/0453* (2013.01)

(58) Field of Classification Search
CPC ............. H04W 72/23; H04W 72/0446; H04W 72/0453; H04L 5/0053
See application file for complete search history.

(56) References Cited

U.S. PATENT DOCUMENTS

2016/0374084 A1* 12/2016 Zhang ............... H04W 72/0453
2019/0124558 A1 4/2019 Ang et al.
(Continued)

FOREIGN PATENT DOCUMENTS

| CA | 3043813 A1 | 11/2019 |
|---|---|---|
| CN | 103812625 A | 5/2014 |

(Continued)

OTHER PUBLICATIONS

Notice of allowance issued in corresponding CN application No. 202010028277.0 dated Jan. 10, 2020.
(Continued)

*Primary Examiner* — Mohammad S Anwar
(74) *Attorney, Agent, or Firm* — HAUPTMAN HAM, LLP

(57) ABSTRACT

A method for generating a downlink control information (DCI) is provided. The method includes the following. Determine a length of each field in a target DCI based on a length of each field in each of expected DCIs corresponding to target cells respectively, where the length of each field in the target DCI is a length required to be compatible with corresponding fields in the expected DCIs. Construct a subfield for each field in the target DCI based on a preset correspondence to enable each subfield of each field in the target DCI to correspond to one of the target cells. Generate each field in the target DCI based on the length of each field in the target DCI and the preset correspondence, to form the target DCI.

20 Claims, 12 Drawing Sheets

(56) References Cited

U.S. PATENT DOCUMENTS

| | | |
|---|---|---|
| 2019/0149365 A1 | 5/2019 | Chatterjee et al. |
| 2019/0261405 A1 | 8/2019 | Ang et al. |
| 2019/0357300 A1 | 11/2019 | Zhou et al. |

FOREIGN PATENT DOCUMENTS

| | | | | |
|---|---|---|---|---|
| CN | 108882382 A | 11/2018 | | |
| CN | 109923811 A | 6/2019 | | |
| WO | WO-2018205874 A1 * | 11/2018 | ........... | H04L 5/0035 |
| WO | 2019158005 A1 | 8/2019 | | |
| WO | WO-2019153250 A1 * | 8/2019 | | |

OTHER PUBLICATIONS

Huawei. "Summary of Thursday offline discussion on PDCCH enhancements", 3GPP TSG RAN WG1 Meeting#97 R1-1907835, May 7, 2019.
WIPO, International Search Report and Written Opinion for International Application No. PCT/CN2021/075600, Apr. 27, 2021.

\* cited by examiner

METHOD FOR GENERATING A DOWNLINK CONTROL INFORMATION, METHOD FOR SCHEDULING A CELL, AND ELECTRONIC DEVICE

CROSS-REFERENCE TO RELATED APPLICATION(S)

This application is a continuation of International Application No. PCT/CN2021/075600, filed on Feb. 5, 2021, which claims priority to Chinese Patent Application No. 202010028277.0, filed on Jan. 10, 2020, which are incorporated herein by reference in their entireties.

TECHNICAL FIELD

This disclosure relates to the technical field of downlink control information (DCI) transmission, and in particular, to a method for generating a DCI, a method for scheduling a cell, and an electronic device.

BACKGROUND

If user equipment (UE) on a serving cell is configured with a higher-layer parameter CrossCarrierSchedulingConfig, a value of a carrier indicator field in a downlink control information (DCI) is CrossCarrierSchedulingConfig. UE on a serving cell is required to monitor a physical downlink control channel (PDCCH) candidate in a UE-specific search space. If UE is not configured with a carrier indicator field, the PDCCH candidate monitored by the UE does not contain a carrier indicator field. If UE is configured with a carrier indicator field, the PDCCH candidate monitored by the UE contains a carrier indicator field. If UE is configured to monitor on another serving cell a PDCCH candidate that contains a carrier indicator field corresponding to a certain secondary cell (SCell), the UE does not expect to monitor the PDCCH candidate on the SCell. For serving cells where UE monitors a PDCCH candidate, the UE at least monitors a PDCCH candidate of a serving cell where the UE is camped on.

In view of that one DCI can contain only scheduling information for one cell, in the related art, in order to schedule multiple cells, it needs to transmit multiple DCIs. Each DCI needs to occupy a corresponding PDCCH. Therefore, in order to schedule multiple cells, it needs to occupy multiple PDCCHs, thereby consuming many communication resources. In addition, one DCI contains only scheduling information for a corresponding cell and is subjected to a length of each field in the DCI, so that the DCI is difficult to be compatible with scheduling information for multiple cells.

SUMMARY

A method for generating a DCI, a method for scheduling a cell, and an electronic device are provided.

A method for generating a DCI is further provided in the disclosure. The method includes the following. Determine a length of each field in a target DCI based on a length of each field in each of expected DCIs corresponding to target cells respectively, where each of the expected DCIs is a DCI required for scheduling one of the target cells individually, and the length of each field in the target DCI is a length required to be compatible with corresponding fields in the expected DCIs. Construct a subfield for each field in the target DCI based on a preset correspondence to enable each subfield of each field in the target DCI to correspond to one of the target cells. Generate each field in the target DCI based on the length of each field in the target DCI and the preset correspondence, to form the target DCI.

A method for scheduling a cell is further provided in the disclosure. The method includes generating the target DCI based on the method for generating a DCI in the disclosure and scheduling the target cells based on the target DCI.

An electronic device is further provided in the disclosure. The electronic device includes a memory, a processor, and computer programs stored in the memory and capable of running on the processor. The computer programs are executed by the processor to cause the processor to perform the following. Determine a length of each field in a target DCI based on a length of each field in each of expected DCIs corresponding to target cells respectively, where each of the expected DCIs is a DCI required for scheduling one of the target cells individually, and the length of each field in the target DCI is a length required to be compatible with corresponding fields in the expected DCIs. Construct a subfield for each field in the target DCI based on a preset correspondence to enable each subfield of each field in the target DCI to correspond to one of the target cells. Generate each field in the target DCI based on the length of each field in the target DCI and the preset correspondence, to form the target DCI.

DETAILED DESCRIPTION

The following will further illustrate the disclosure by means of embodiments, but the disclosure is not limited to the scope of the embodiments.

The following will illustrate a downlink control information (DCI).

A DCI can contain only scheduling information for one cell, e.g., a scheduled DCI format in new radio (NR) contains DCI 0_0/0_1/0_2/1_0/1_1/1_2. DCI 1_0 contains:
identifier for DCI formats-1 bits;
frequency domain resource assignment—$\lceil \log_2(N_{RB}^{DL,BWP}(N_{RB}^{DL,BWP}+1)/2) \rceil$ bits, where $N_{RB}^{DL,BWP}$ represents the number of resource blocks (RBs) in a downlink (DL) bandwidth part (BWP), and uplink (UL) resource assignment and DL resource assignment are identical in the frequency domain resource assignment;
time domain resource assignment-X bits;
virtual resource block (VRB)-to-physical resource block (PRB) mapping-1 bit;
modulation and coding scheme (MCS)-5 bits;
new data indicator (NDI)-1 bit;
redundancy version (RV)-2 bits;
hybrid automatic repeat request (HARQ) process number-4 bits;
DL assignment index-2 bits;
transmit power control (TPC) command for scheduled physical uplink control channel (PUCCH)-2 bits;
PUCCH resource indicator-2 bits;
physical downlink shared channel (PDSCH)-to-HARQ_feedback timing indicator-3 bits.
DCI 1_1 contains:
carrier indicator-0 or 3 bits;
identifier for DCI formats-1 bits;
BWP indicator-0, 1, or 2 bits;
frequency domain resource assignment—$\lceil N_{RB}^{DL,BWP}/P \rceil$ bits if only resource allocation type 0 is configured, $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil, \lceil N_{RB}^{DL,BWP}/P \rceil)+1$ bits if both the resource allocation type 0 and the resource allocation type 1 are configured, where P represents a size of a resource block group (RBG), and RBG represents an RB group;
time domain resource assignment-1, 2, 3, or 4 bits;
VRB-to-PRB mapping-0 or 1 bit;
PRB bundling size indicator-0 or 1 bit;
rate matching indicator-0, 1, or 2 bits;
zero power (ZP) channel state information-reference signal (CSI-RS) trigger-X bits. Transport block (TB) 1 contains:
MCS-5 bits;
NDI-1 bit;
RV-2 bits.
TB 2 contains:
MCS-5 bits;
NDI-1 bit;
RV-2 bits;
HARQ process number-4 bits;
DL assignment index-0 or 4 bits;
TPC command for scheduled PUCCH-2 bits;
PUCCH resource indicator-2 bits;
PDSCH-to-HARQ_feedback timing indicator-3 bits;
antenna ports-4, 5, or 6 bits;
transmission configuration indication-0 bit or 3 bits;
sounding reference signal (SRS) request-2 bits;
code block group (CBG) transmission information-0, 2, 4, 6, or 8 bits;
CBG flushing out information-0 or 1 bit;
demodulation reference signal (DMRS) sequence initialization-0 or 1 bit.

Embodiment 1

Figure 1:
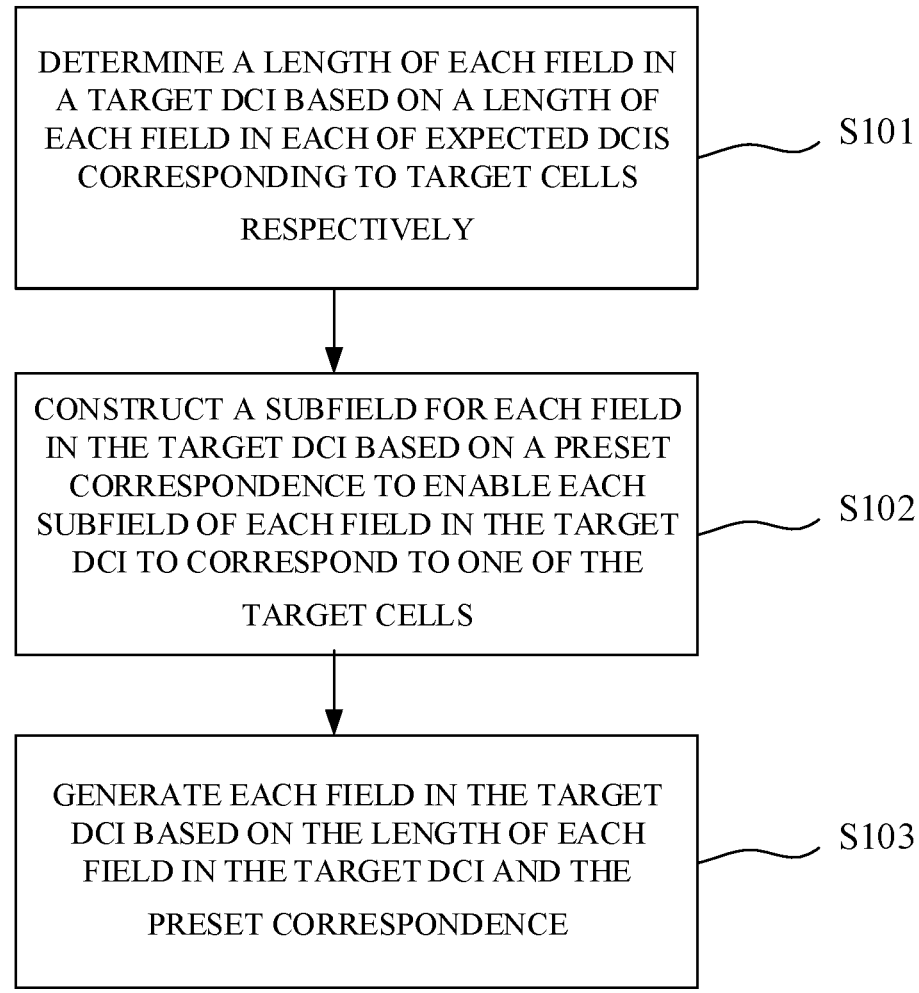
FIG. 1 is a flow chart illustrating a method for generating a downlink control information (DCI) in embodiment 1 of the disclosure.

A method for generating a downlink control information (DCI) is provided in the embodiment. Referring to FIG. 1, the method for generating a DCI includes the following.

At S101, determine a length of each field in a target DCI based on a length of each field in each of expected DCIs corresponding to target cells respectively. The number of the target cells is multiple, each of the expected DCIs is a DCI required for scheduling one of the target cells individually, and the length of each field in the target DCI is a length required to be compatible with corresponding fields in the expected DCIs.

At S102, construct a subfield for each field in the target DCI based on a preset correspondence to enable each subfield of each field in the target DCI to correspond to one of the target cells.

At S103, generate each field in the target DCI based on the length of each field in the target DCI and the preset correspondence, to form the target DCI.

By determining the length of each field in the target DCI based on the length of each field in each of the expected DCIs corresponding to the target cells respectively, each field in the target DCI can has a suitable length to be compatible with corresponding fields corresponding to the cells, such that each field can contain scheduling information for the cells. That is, one DCI can be compatible with the scheduling information for the cells, thereby supporting simultaneous scheduling of the cells. During scheduling of the cells, it is only required to generate and transmit one target DCI, and only one physical downlink control channel (PDCCH) is occupied, thereby saving communication resources such as PDCCHs.

Embodiment 2

A method for generating a DCI is provided in the embodiment on the basis of the embodiment 1.

As a specific implementation, at S101, determine a length of a corresponding field in the target DCI based on a maximum value among lengths of corresponding fields in the expected DCIs.

The number of the target cells is supposed to be K. Generally, for individual scheduling of the K target cells, it needs to configure expected DCIs respectively for the K target cells. Taking a frequency-domain-resource assignment field as an example, frequency-domain-resource assignment fields in the expected DCIs each have a length corresponding to a corresponding target cell. In an optional implementation, a maximum value among the lengths is assigned as a length of a frequency-domain-resource assignment field in the target DCI. Determining manners of lengths of other fields in the target DCI are similar to the above. Accordingly, the length of the target DCI generated can be compatible with scheduling information for the target cells, thereby realizing that one target DCI contains the scheduling information for the target cells to support simultaneous scheduling of the target cells. In another optional implementations, the length of the frequency-domain-resource assignment field in the target DCI is a sum of the maximum value among the lengths and a preset bit-width value. A subfield corresponding to the preset bit-width value is used to configure resource allocation types for the target cells. Determining manners of lengths of other fields in the target DCI are similar to the above.

As an optional implementation, supposing that a length of a certain field in the target DCI is W bits, the field contains W-bit scheduling information, where the W-bit scheduling information is used to schedule the target cells. In specific implementations, the target DCI is transmitted through a preset PDCCH, where the PDCCH corresponds to the target cells. Subsequent to reception of the target DCI, the target cells respectively obtain the W-bit scheduling information in the field in the target DCI by analyzing the target DCI. In the target cells, if this field in an expected DCI corresponding to a certain target cell has Y (Y is less than or equal to W) bits, the target cell assigns lowest Y bits in the W-bit scheduling information as a subfield corresponding to the target cell to obtain corresponding scheduling information. For example, for a target cell the field corresponding to the target cell has W bits, the complete field is assigned as a subfield corresponding to the target cell to obtain corresponding scheduling information. Alternatively, for a target cell the field corresponding to the target cell has X (X is less than W) bits, lowest X bits in the field are assigned as a subfield corresponding to the target cell to obtain corresponding scheduling information. Usage of other fields in the target DCI for the target cells is similar to the above. Based on this, one target DCI can be compatible with configuration information for multiple cells.

In a first optional implementation, on condition that each of the target cells supports only resource allocation type 1, the length (the number of bits) of the frequency-domain-resource assignment field is up to a BWP for a target cell corresponding to a maximum number of physical resource blocks (PRBs) in the target cells. That is, on condition that each of the target cells supports only the resource allocation type 1, the length of the frequency-domain-resource assignment field in the target DCI is $\max(\lceil \log_2(N(n)_{RB}^{DL,BWP}(N(n)_{RB}^{DL,BWP}+1)/2) \rceil)$, where $n \in [1, K]$, and K is the number of the target cells. $N(n)_{RB}^{DL,BWP}$ ($n \in [1, K]$) respectively corresponds to each of the target cells.

In a second optional implementation, on condition that each of the target cells supports only resource allocation type 0, the length of the frequency-domain-resource assignment field is up to a BWP for a target cell corresponding to a maximum value of $N_{RBG}$ in the target cells. That is, on condition that each of the target cells supports only the resource allocation type 0, the length of the frequency-domain-resource assignment field is $\max(N(n)_{RBG})$, where $n \in [1, K]$, and K is the number of the target cells. $N(n)_{RB}^{DL,BWP} = \lceil N(n)_{RB}^{DL,BWP}/P \rceil$ ($n \in [1, K]$) respectively corresponds to each of the target cells.

In a third optional implementation, on condition that in the target cells, a part of the target cells support only the resource allocation type 0, and the other part of the target cells support only the resource allocation type 1, the length of the frequency-domain-resource assignment field is $\max(\max(\lceil \log_2(N(i)_{RB}^{DL,BWP}(N(i)_{RB}^{DL,BWP}+1)/2) \rceil), \max(N(j)_{RBG}))$, where $N(i)_{RB}^{DL,BWP}$ respectively corresponds to each of the part of the target cells supporting only the resource allocation type 0, and $N(j)_{RBG}$ respectively corresponds to each of the other part of the target cells supporting only the resource allocation type 1. As an optional implementation, in the target cells, the number of the part of the target cells supporting only the resource allocation type 0 is L, and the number of the other part of the target cells supporting only the resource allocation type 1 is M (L+M=K, K is the number of target cells expected to be scheduled, and L, M, and K are all positive integers), where $i \in [1, L]$, and $j \in [1, M]$.

In a fourth optional implementation, on condition that each of the target cells supports both the resource allocation type 0 and the resource allocation type 1, the frequency-domain-resource assignment field in the target DCI includes a type indicator bit indicative of that each of the target cells corresponds to the resource allocation type 1 or the resource allocation type 0, and the length of the frequency-domain-resource assignment field is $(\max(\max(\lceil \log_2(N(n)_{RB}^{DL,BWP}(N(n)_{RB}^{DL,BWP}+1)/2) \rceil), \max(N(n)_{RBG}))+1)$, where $n \in [1, K]$, $N(n)_{RB}^{DL,BWP}$ corresponds to a mode in which each of the target cells is indicated as the resource allocation type 1, $N(n)_{RBG}$ corresponds to a mode in which each of the target cells is indicated as the resource allocation type 0, and K is the number of the target cells. As an optional implementation, a most significant bit (MSB) of the frequency-domain-resource assignment field in the DCI is assigned as the type indicator bit. When a value of the type indicator bit is 0, each of the target cells is indicated as the resource allocation type 0. When the value of the type indicator bit is 1, each of the target cells is indicated as the resource allocation type 1.

In a fifth optional implementation, the frequency-domain-resource assignment field in the target DCI includes K type indicator bits, each of the K type indicator bits corresponds to one of the target cells and indicates that the one of the target cells corresponds to the resource allocation type 1 or the resource allocation type 0, and the length of the frequency-domain-resource assignment field is $(\max(\max(\lceil \log_2(N(n)_{RB}^{DL,BWP}(N(n)_{RB}^{DL,BWP}+1)/2) \rceil), \max(N(n)_{RBG}))+K)$, where $n \in [1, K]$, $N(n)_{RB}^{DL,BWP}$ corresponds to the mode in which each of the target cells is indicated as the resource allocation type 1, $N(n)_{RBG}$ corresponds to the mode in which each of the target cells is indicated as the resource allocation type 0, and K is the number of the target cells. As an optional implementation, each of highest K bits of the frequency-domain-resource assignment field in the DCI is a type indicator bit. An MSB of the frequency-domain-resource assignment field corresponds to a first target cell. When a value of the bit is 0, the first target cell is indicated as the resource allocation type 0. When the value of the bit is 1, the first target cell is indicated as the resource allocation type 1. If the first target cell supports only the resource allocation type 0 or the resource allocation type 1, the first target cell ignores the bit, and a resource allocation type of the first target cell is not affected by the bit. A second highest bit of the frequency-domain-resource assignment field corresponds to a second target cell. When a value of the bit is 0, the second target cell is indicated as the resource allocation type 0. When the value of the bit is 1, the second target cell is indicated as the resource allocation type 1. If the second target cell supports only the resource allocation type 0 or the resource allocation type 1, the second target cell ignores the bit, and a resource allocation type of the second target cell is not affected by the bit. Accordingly, a Kth highest bit of the frequency-domain-resource assignment field corresponds to a Kth target cell. When a value of the bit is 0, the Kth target cell is indicated as the resource allocation type 0.

When the value of the bit is 1, the Kth target cell is indicated as the resource allocation type 1. If the Kth target cell supports only the resource allocation type 0 or the resource allocation type 1, the Kth target cell ignores the bit, and a resource allocation type of the Kth target cell is not affected by the bit.

By determining the length of a corresponding field in the target DCI based on the maximum value among the lengths of corresponding fields in the expected DCIs, through a relatively small length, the corresponding field in the target DCI can be compatible with all the target cells required to be scheduled, thereby saving resources.

Based on the method for generating a DCI in the embodiment, by reasonably setting the length of the target DCI and information in corresponding fields in the target DCI, one target DCI can be compatible with scheduling information for the cells, thereby supporting simultaneous scheduling of the cells. During scheduling of multiple cells, it is only required to generate and transmit one target DCI, and only one PDCCH is occupied, thereby saving communication resources such as PDCCHs.

Embodiment 3

A method for generating a DCI is provided in the embodiment on the basis of the embodiment 1. In the embodiment, as a specific implementation, at S101, determine a length of a corresponding field in the target DCI based on a sum of lengths of corresponding fields in the expected DCIs.

The number of the target cells is supposed to be K. Generally, for individual scheduling of the K target cells, it needs to configure expected DCIs respectively for the K target cells. Taking a frequency-domain-resource assignment field as an example, frequency-domain-resource assignment fields in the expected DCIs each have a length corresponding to a corresponding target cell. A length of a frequency-domain-resource assignment field in an expected DCI corresponding to an ith target cell is supposed to be $W_i$ ($i \in [1, K]$).

In an optional implementation, a length of a frequency-domain-resource assignment field in the target DCI is $W = \sum_{i=1}^{K} W_i$. In the frequency-domain-resource assignment field, lowest W1 bits (i.e., a W1th bit to a first bit of the frequency-domain-resource assignment field, where the first bit is a lowest bit of the frequency-domain-resource assignment field) construct a first subfield, where the first subfield corresponds to a first target cell. W2 bits (i.e., a (W1+W2)th bit to a (W1+1)th bit of the frequency-domain-resource assignment field) adjacent to the first subfield construct a second subfield, where the second subfield corresponds to a second target cell. Accordingly, highest WK bits of the frequency-domain-resource assignment field construct a Kth subfield, where the Kth subfield corresponds to a Kth target cell. Subsequent to reception of the target DCI, each target cell parses the frequency-domain-resource assignment field in the target DCI, and obtains corresponding configuration information from a corresponding subfield in the frequency-domain-resource assignment field based on a preset correspondence. Determining manners and usage of lengths of other fields in the target DCI are similar to the above. Accordingly, the length of the target DCI generated can be compatible with scheduling information for the target cells, thereby realizing that one target DCI contains the scheduling information for the target cells to support simultaneous scheduling of the target cells.

In another optional implementation, the length of the frequency-domain-resource assignment field in the target DCI is $W = A + \sum_{i=1}^{K} W_i$. In the frequency-domain-resource assignment field, the lowest W1 bits (i.e., the W1th bit to the first bit of the frequency-domain-resource assignment field, where the first bit is the lowest bit of the frequency-domain-resource assignment field) construct the first subfield, where the first subfield corresponds to the first target cell. W2 bits (i.e., the (W1+W2)th bit to the (W1+1)th bit of the frequency-domain-resource assignment field) adjacent to the first subfield construct the second subfield, where the second subfield corresponds to the second target cell. Accordingly, a $\sum_{i=1}^{K} W_j$ th bit to a $(1+\sum_{j=1}^{K-1} W_j)$th bit of the frequency-domain-resource assignment field construct a Kth subfield, where the Kth subfield corresponds to a Kth target cell. Highest A bits of the frequency-domain-resource assignment field are used to configure resource allocation types of the target cells. Determining manners and usage of lengths of other fields in the target DCI are similar to the above.

By determining the length of a corresponding field in the target DCI based on the sum of the lengths of corresponding fields in the expected DCIs, subfields respectively corresponding to the target cells can be relatively separate, such that configuration for a certain target cell may not be affected or limited by configuration for other cells, thereby having a relative high flexibility.

Based on the method for generating a DCI in the embodiment, by reasonably setting the length of the target DCI and information in corresponding fields in the target DCI, one target DCI can be compatible with scheduling information for the cells, thereby supporting to simultaneous scheduling of the cells. During scheduling of multiple cells, it is only required to generate and transmit one target DCI, and only one PDCCH is occupied, thereby saving communication resources such as PDCCHs.

Embodiment 4

Figure 2:
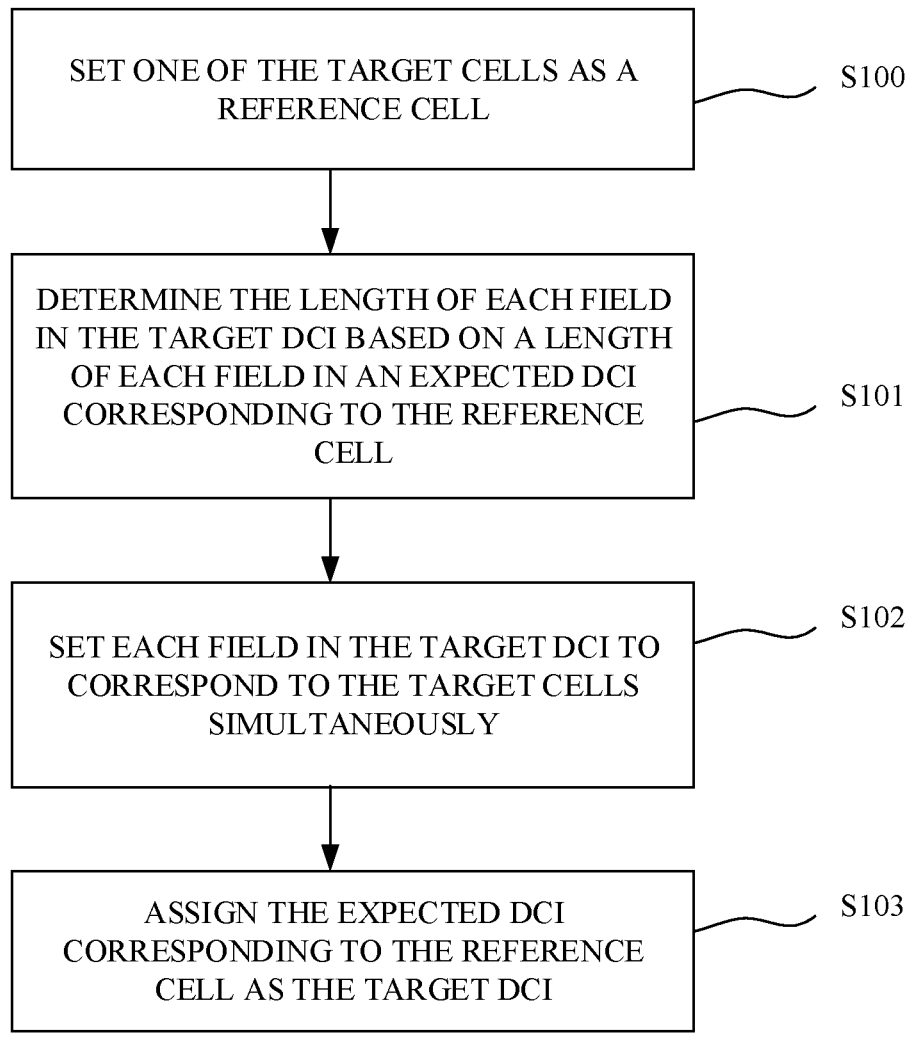
FIG. 2 is a flow chart illustrating a method for generating a DCI in embodiment 4 of the disclosure.

A method for generating a DCI is provided in the embodiment on the basis of the embodiment 1. Referring to FIG. 2, the method for generating a DCI further includes the following.

At S100, set one of the target cells as a reference cell.

S101 includes determining the length of each field in the target DCI based on a length of each field in an expected DCI corresponding to the reference cell.

S102 includes setting each field in the target DCI to correspond to the target cells simultaneously.

S103 includes assigning the expected DCI corresponding to the reference cell as the target DCI.

That is, during scheduling of the target cells, each of other target cells except for the reference cell adopts the same configuration as the reference cell.

In specific implementations, the target DCI (i.e., the expected DCI corresponding to the reference cell) is transmitted through a preset PDCCH, where the PDCCH corresponds to the target cells. Subsequent to reception of the target DCI, the target cells can obtain corresponding scheduling information by analyzing the target DCI. Based on the method for generating a DCI in the embodiment, one DCI can be compatible with scheduling information for multiple cells, thereby supporting simultaneous scheduling of the multiple cells. During scheduling of multiple cells, it is only required to generate and transmit one target DCI, and only one PDCCH is occupied, thereby saving communication resources such as PDCCHs.

Embodiment 5

Figure 3:
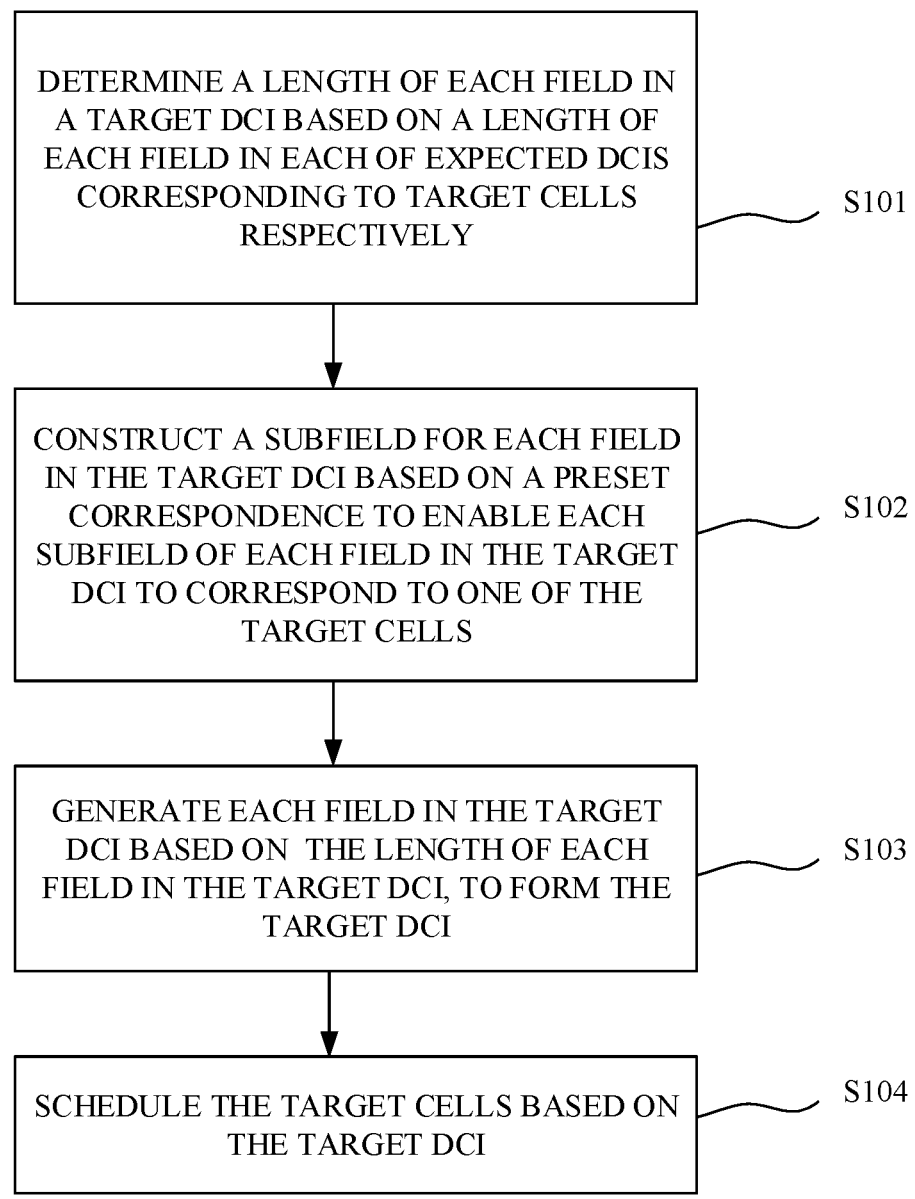
FIG. 3 is a flow chart illustrating a method for generating a DCI in embodiment 5 of the disclosure.

A method for scheduling a cell is provided in the embodiment. Referring to FIG. 3, the method for scheduling a cell includes generating the target DCI based on the method for generating a DCI in any one of the embodiments 1 to 3. The method for scheduling a cell further includes the following.

At S104, schedule the target cells based on the target DCI.

The target DCI can be compatible with the scheduling information for the target cells, thereby supporting simultaneous scheduling of the target cells through one target DCI. By scheduling the target cells based on the target DCI, only one PDCCH is occupied, thereby saving communication resources such as PDCCHs.

Embodiment 6

Figure 4:
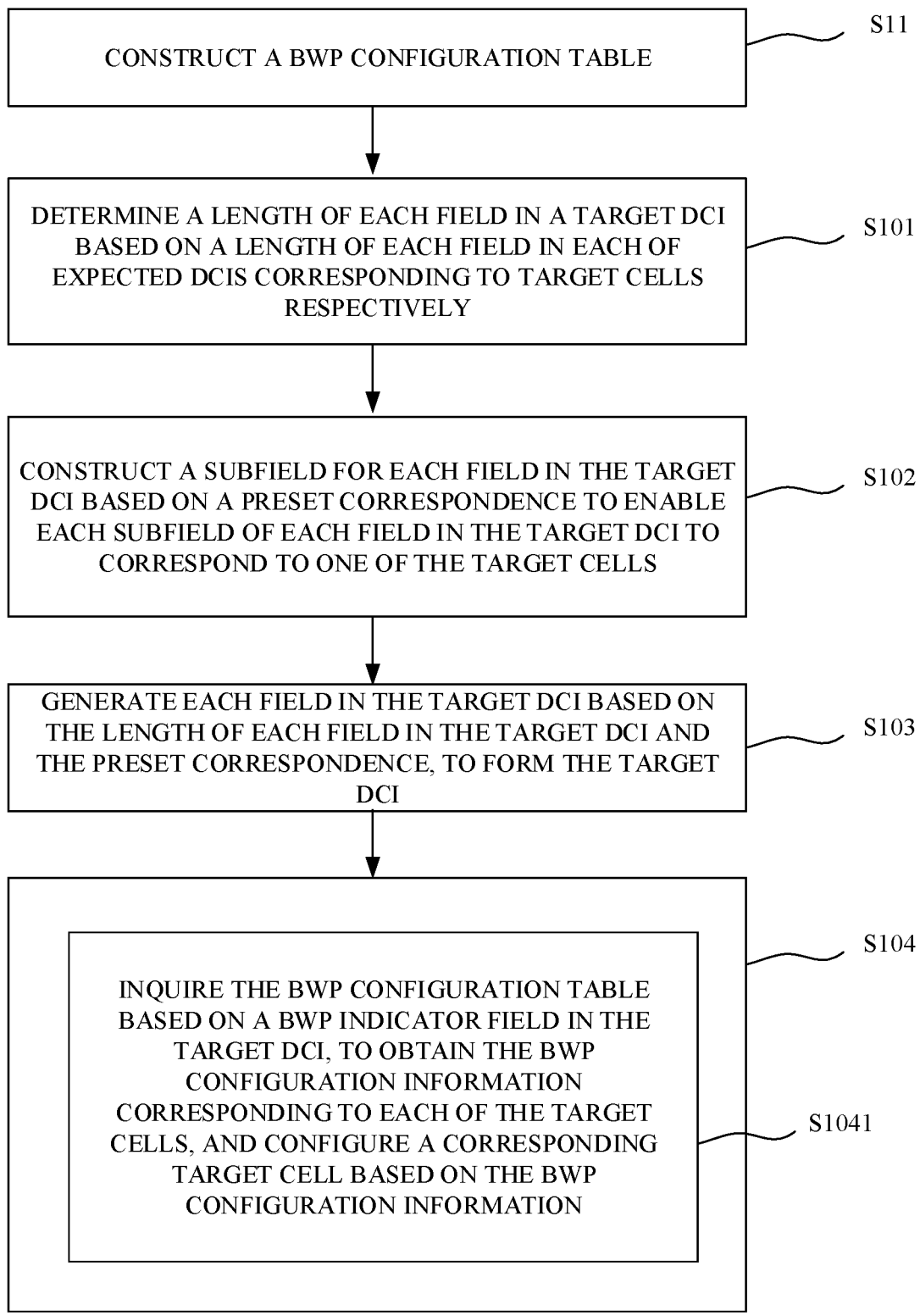
FIG. 4 is a flow chart illustrating a method for generating a DCI in embodiment 6 of the disclosure.

A method for scheduling a cell is provided in the embodiment on the basis of the embodiment 5. Referring to FIG. 4, the method for scheduling a cell includes the following.

At S11, construct a BWP configuration table. The BWP configuration table contains BWP configuration information corresponding to each of the target cells.

S104 includes S1041. At 1041, inquire the BWP configuration table based on a BWP indicator field in the target DCI, to obtain the BWP configuration information corresponding to each of the target cells, and configure a corresponding target cell based on the BWP configuration information.

In a first optional implementation, the BWP configuration table is configured by higher-layer signaling (radio resource control (RRC) signaling). The number of the target cells being 2 is taken as an example. Referring to Table 1, a first column of the BWP configuration table is an index column, a second column contains BWP configuration information corresponding to a first cell (cell 1), and a third column contains BWP configuration information corresponding to a second cell (cell 2). When a value of the BWP indicator field of the DCI is 1, a row where a value of the BWP configuration index is 1 in the BWP configuration table is correspondingly used, such that the BWP configuration information corresponding to the cell 1 is 1, and the BWP configuration information corresponding to the cell 2 is 1. The cell 1 and the cell 2 perform BWP switching based on their respective BWP configuration information. Specific meaning of the BWP configuration information is known by those skilled in the art, which will not be repeated herein.

In other optional implementations, the BWP configuration table supports at least three target cells, and the number of columns of the BWP configuration table is suited to the number of the target cells.

In another optional implementation, a format of rows and columns of the BWP configuration table adopted is obtained through transposition based on Table 1.

TABLE 1

| BWP configuration index | BWP configuration information corresponding to cell 1 | BWP configuration information corresponding to cell 2 |
|---|---|---|
| 0 | 0 | 0 |
| 1 | 1 | 1 |
| 2 | 2 | 2 |

In a second optional implementation, for improving efficiency of BWP switching, the BWP configuration information includes an activation mode, where the activation mode is indicative of that a corresponding target cell maintains a current BWP. Referring to Table 2, the activation mode is represented with "active BWP", representing that performing no BWP switching and the current BWP is still used. Benefits of the activation mode lie in that a PDCCH on a single cell can be used to perform BWP switching for the single cell, and scheduling for a part or all of PDCCHs on multiple cells is performed based on the current BWP without further active BWP adjustment, thereby facilitating to improving efficiency of BWP switching. Based on Table 2, when the value of the BWP indicator field of the DCI is 1, the row where the value of the BWP configuration index is 1 in the BWP configuration table is correspondingly used, and thus the BWP configuration information corresponding to the cell 1 is "active BWP", and the cell 1 still uses the current BWP; the BWP configuration information corresponding to the cell 2 is 1, and the cell 2 performs BWP switching based on the BWP configuration information corresponding to the cell 2.

In other optional implementations, the BWP configuration table supports at least three target cells, and the number of columns of the BWP configuration table is suited to the number of the target cells.

In another optional implementation, a format of rows and columns of the BWP configuration table adopted is obtained through transposition based on Table 2.

TABLE 2

| BWP configuration index | BWP configuration information corresponding to cell 1 | BWP configuration information corresponding to cell 2 |
|---|---|---|
| 0 | 0 | 0 |
| 1 | active BWP | 1 |
| 2 | 2 | active BWP |
| 3 | active BWP | active BWP |

By setting the BWP configuration table, when multiple cells are scheduled based on the method for scheduling a cell in the embodiment, BWPs for the cells can be simultaneously configured, improving efficiency.

Embodiment 7

Figure 5:
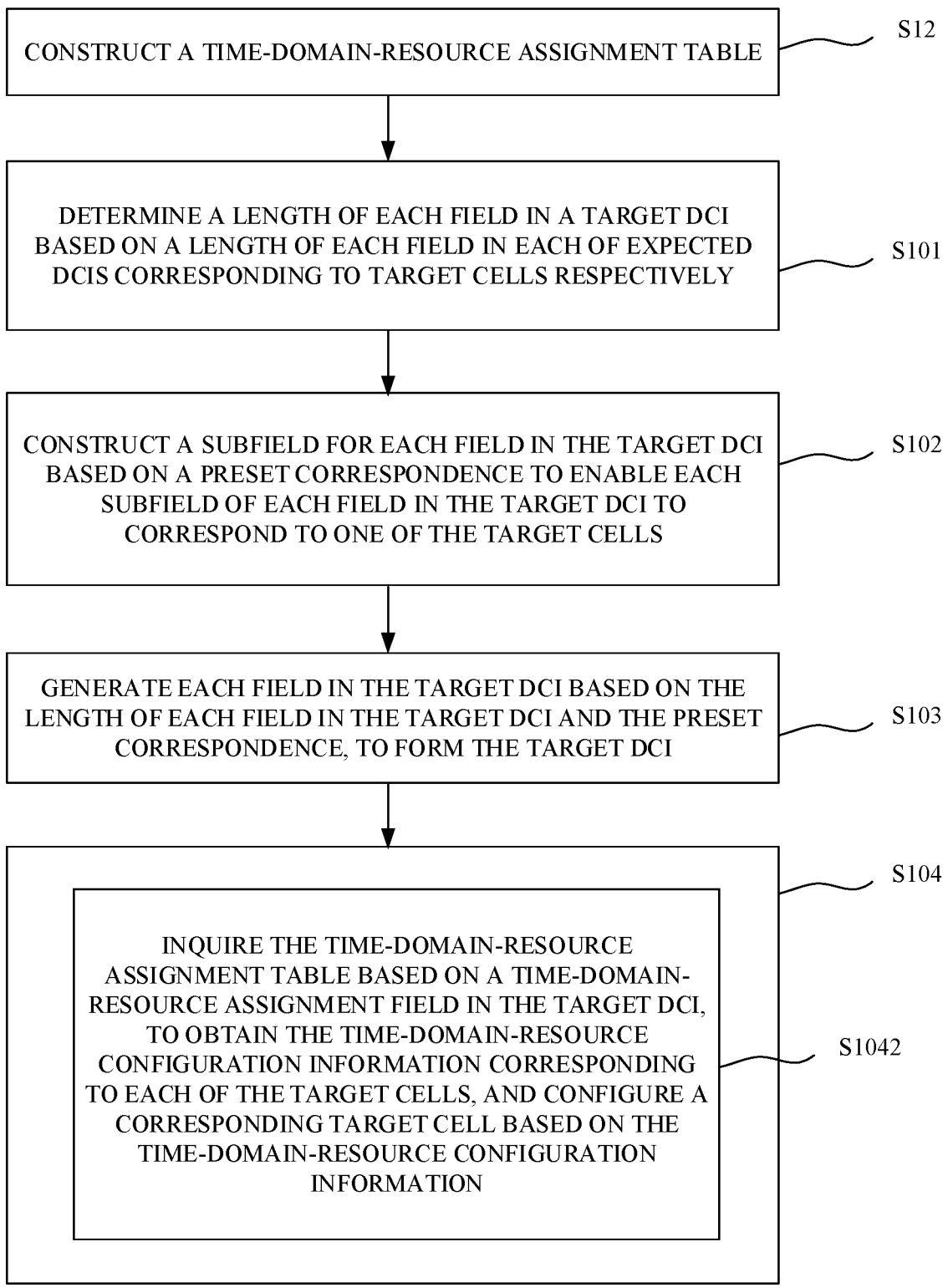
FIG. 5 is a flow chart illustrating an optional implementation of a method for generating a DCI in embodiment 7 of the disclosure.

A method for scheduling a cell is provided in the embodiment on the basis of the embodiment 5. Referring to FIG. 5, in an optional implementation, the method for scheduling a cell may further include the following.

At S12, construct a time-domain-resource assignment table. The time-domain-resource assignment table contains time-domain-resource configuration information corresponding to each of the target cells.

S104 includes S1042. At S1042, inquire the time-domain-resource assignment table based on a time-domain-resource assignment field in the target DCI, to obtain the time-domain-resource configuration information corresponding to each of the target cells, and configure a corresponding target cell based on the time-domain-resource configuration information.

In a first optional implementation, the time-domain-resource assignment table includes an index block and multiple table blocks, each of the multiple table blocks corresponds to one of the target cells, and each element in the index block is used to index simultaneously corresponding elements in the multiple table blocks, to obtain the time-domain-resource configuration information. At S1032, index simultaneously corresponding elements in the multiple table blocks based on an element corresponding to the time-domain-resource assignment field in the index block, to obtain the time-domain-resource configuration information.

Specifically referring to Table 3, the time-domain-resource assignment table is a single table. "Time-domainresource assignment (TDRA) index" column in the time-domain-resource assignment table is assigned as the index block. A second column to a fifth column of the time-domain-resource assignment table construct a first table block, where the first table block corresponds to the cell 1. The second column, i.e., "K0 (downlink (DL)) or K2 (uplink (UL)) (time-domain offset) for cell 1" column, includes time-domain offset information, "start and length indicator (SLIV) for cell 1" column includes SLIV configuration information, "mapping type for cell 1" column includes mapping type configuration information, and "repetition for cell 1" column includes retransmission configuration information. A sixth column to a ninth column of the time-domain-resource assignment table construct a second table block, where the second table block corresponds to the cell 2. A structure of the second table block is similar to that of the first table block.

Values in the "TDRA index" column are respectively 0, 1, 2, . . . , 15. The values of the TDRA index and values of corresponding time-domain offset/SLIV/mapping type/repetition are similar to those in the related art, such that several behavior illustration is omitted in Table 3.

Subsequent to generation of the target DCI, obtain time-domain-resource configuration information corresponding to each of the target cells by inquiring the time-domain-resource assignment table based on a value of the time-domain-resource assignment field in the target DCI (corresponding to a value of the TDRA index). For example, if the value of the time-domain-resource assignment field in the target DCI is 1, obtain the time-domain-resource configuration information corresponding to each of the target cells based on a row where the value of the TDRA index is 1 in the time-domain-resource assignment table.

In other optional implementations, the time-domain-resource assignment table supports at least three target cells, and the number of table blocks in the time-domain-resource assignment table is suited to the number of the target cells.

In another optional implementation, a format of rows and columns of the time-domain-resource assignment table adopted is obtained through transposition based on Table 3.

sub-tables, reference can be made to Table 4 and Table 5 respectively, where a first sub-table (Table 4) corresponds to the cell 1, and a second sub-table (Table 5) corresponds to the cell 2.

In the first sub-table, "TDRA index" column is assigned as the index block, and a second column to a fourth column construct a first table block, where the first table block corresponds to the cell 1. The second column, i.e., "K0 (DL) or K2 (UL) (time-domain offset)" column, includes time-domain offset information, "SLIV" column includes SLIV configuration information, "mapping type" column includes mapping type configuration information, and "repetition for cell 1" column includes retransmission configuration information. The first table block includes 4 columns, i.e., time-domain offset/SLIV/mapping type/repetition columns, where the 4 columns are respectively used to configure time-domain offset/SLIV/mapping type/repetition information for the cell 1. A structure of the second sub-table is similar to that of the first sub-table, "TDRA index" column is assigned as the index block, and a second column to a fourth column construct a second table block, where the second table block corresponds to the cell 2.

Subsequent to generation of the target DCI, obtain time-domain-resource configuration information corresponding to a cell by inquiring each of the multiple sub-tables based on the value of the time-domain-resource assignment field in the target DCI (corresponding to a value of the TDRA index). For example, if the value of the time-domain-resource assignment field in the target DCI is 1, obtain time-domain-resource configuration information corresponding to the cell 1 based on a row where the value of the TDRA index is 1 in the first sub-table, and obtain time-domain-resource configuration information corresponding to the cell 2 based on a row where the value of the TDRA index is 1 in the second sub-table.

In other optional implementations, the time-domain-resource assignment table supports at least three target cells greater than or equal to 3, and the number of sub-tables in the time-domain-resource assignment table is suited to the number of the target cells.

TABLE 3

| TDRA index | K0 (DL) or K2 (UL) for cell 1 | SLIV for cell 1 | Mapping type for cell 1 | Repetition for cell 1 | K0 (DL) or K2 (UL) for cell 2 | SLIV for cell 2 | Mapping type for cell 2 | Repetition for cell 2 |
|---|---|---|---|---|---|---|---|---|
| 0 | 1 | 145 | Type B | 2 | 1 | 145 | Type B | 4 |
| 1 | 2 | 136 | Type B | 2 | 2 | 145 | Type B | 4 |
| . . . | | | | | | | | |
| 15 | 1 | 78 | Type B | 1 | 1 | 98 | Type B | 1 |

In a second optional implementation, the time-domain-resource assignment table includes multiple sub-tables, each of the multiple sub-tables includes an index block and a table block, each table block corresponds to one of the target cells, and each element in the index block is used to index corresponding elements in a corresponding table block, to obtain the time-domain-resource configuration information. At S1032, index corresponding elements in the table block based on an element corresponding to the time-domain-resource assignment field in the index block, to obtain the time-domain-resource configuration information corresponding to each of the target cells.

When the number of the target cells is 2, the time-domain-resource assignment table includes 2 sub-tables. For the 2

In another optional implementation, a format of rows and columns of sub-tables of the time-domain-resource assignment table is obtained through transposition based on Table 4 and Table 5.

TABLE 4

| TDRA index | K0 (DL) or K2 (UL) | SLIV | Mapping type |
|---|---|---|---|
| 0 | 1 | 145 | Type B |
| 1 | 2 | 136 | Type B |
| . . . | | | |
| 15 | 1 | 78 | Type B |

TABLE 5

| TDRA index | K0 (DL) or K2 (UL) | SLIV | Mapping type |
| --- | --- | --- | --- |
| 0 | 1 | 145 | Type B |
| 1 | 2 | 136 | Type B |
| ... | | | |
| 15 | 1 | 78 | Type B |

Values in the "TDRA index" column are respectively 0, 1, 2, . . . , 15. The value of the TDRA index and values of time-domain offset/SLIV/mapping type are similar to those in the related art, such that several behavior illustration is omitted in Table 4 and Table 5.

Figure 6:
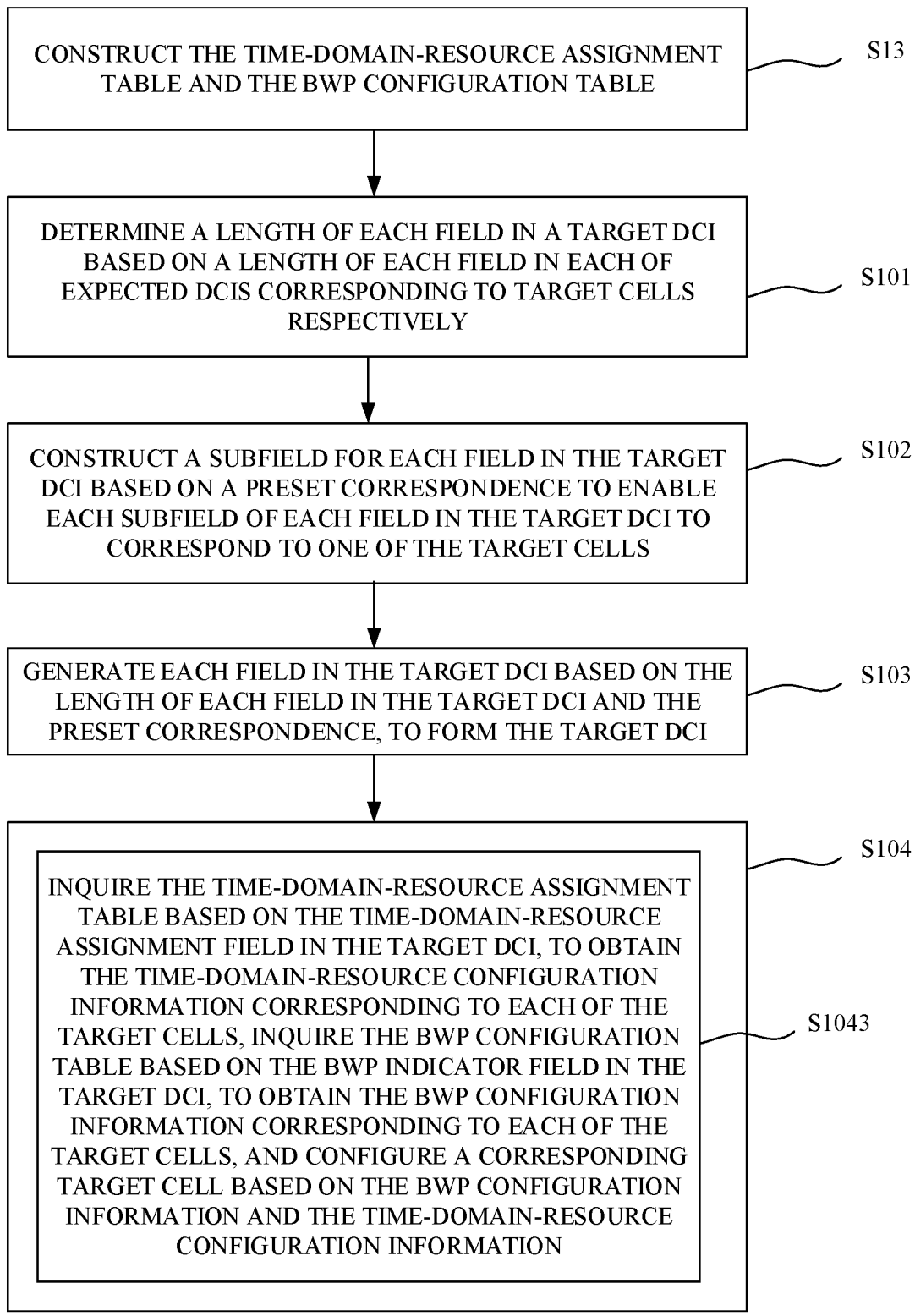
FIG. 6 is a flow chart illustrating another optional implementation of the method for generating a DCI in the embodiment 7 of the disclosure.

In another optional implementation, the method for scheduling a cell illustrated in FIG. 6 is obtained by combining the method for scheduling a cell in the embodiment and the method for scheduling a cell in the embodiment 6. At S13, construct the time-domain-resource assignment table and the BWP configuration table. At S1043, inquire the time-domain-resource assignment table based on the time-domain-resource assignment field in the target DCI, to obtain the time-domain-resource configuration information corresponding to each of the target cells, inquire the BWP table based on the BWP indicator field in the target DCI, to obtain the BWP configuration information corresponding to each of the target cells, and configure a corresponding target cell based on the BWP configuration information and the time-domain-resource configuration information.

Based on the method for scheduling a cell in the embodiment, by improving the time-domain-resource assignment table, simultaneous scheduling of multiple cells can be realized through one DCI, saving communication resources such as PDCCHs.

Embodiment 8

Figure 7:
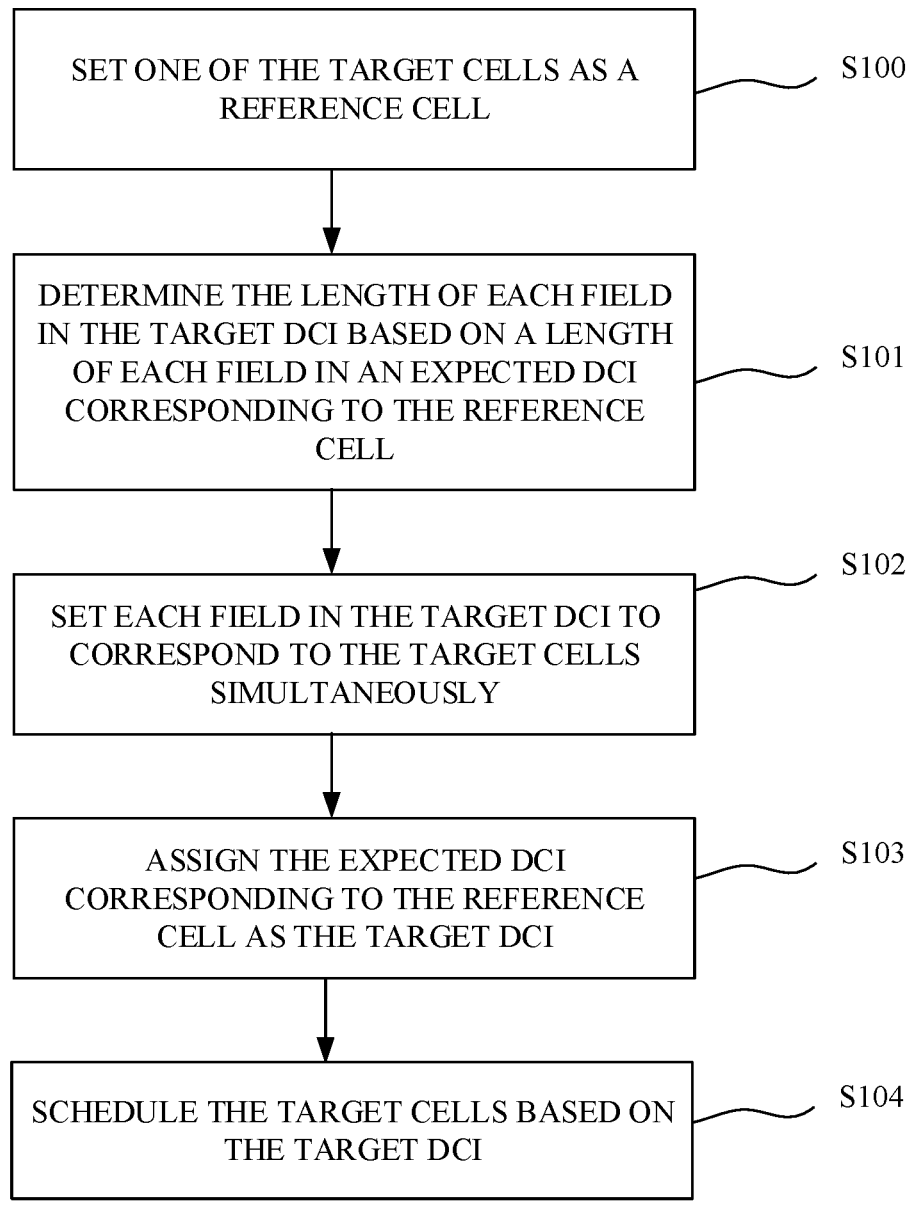
FIG. 7 is a flow chart illustrating an optional implementation of a method for generating a DCI in embodiment 8 of the disclosure.

A method for scheduling a cell is provided in the embodiment. Referring to FIG. 7, in an optional embodiment, the method for scheduling a cell includes generating the target DCI based on the method for generating a DCI in the embodiment 4.

The method for scheduling a cell further includes the following.

At S104, schedule the target cells based on the target DCI.

Figure 8:
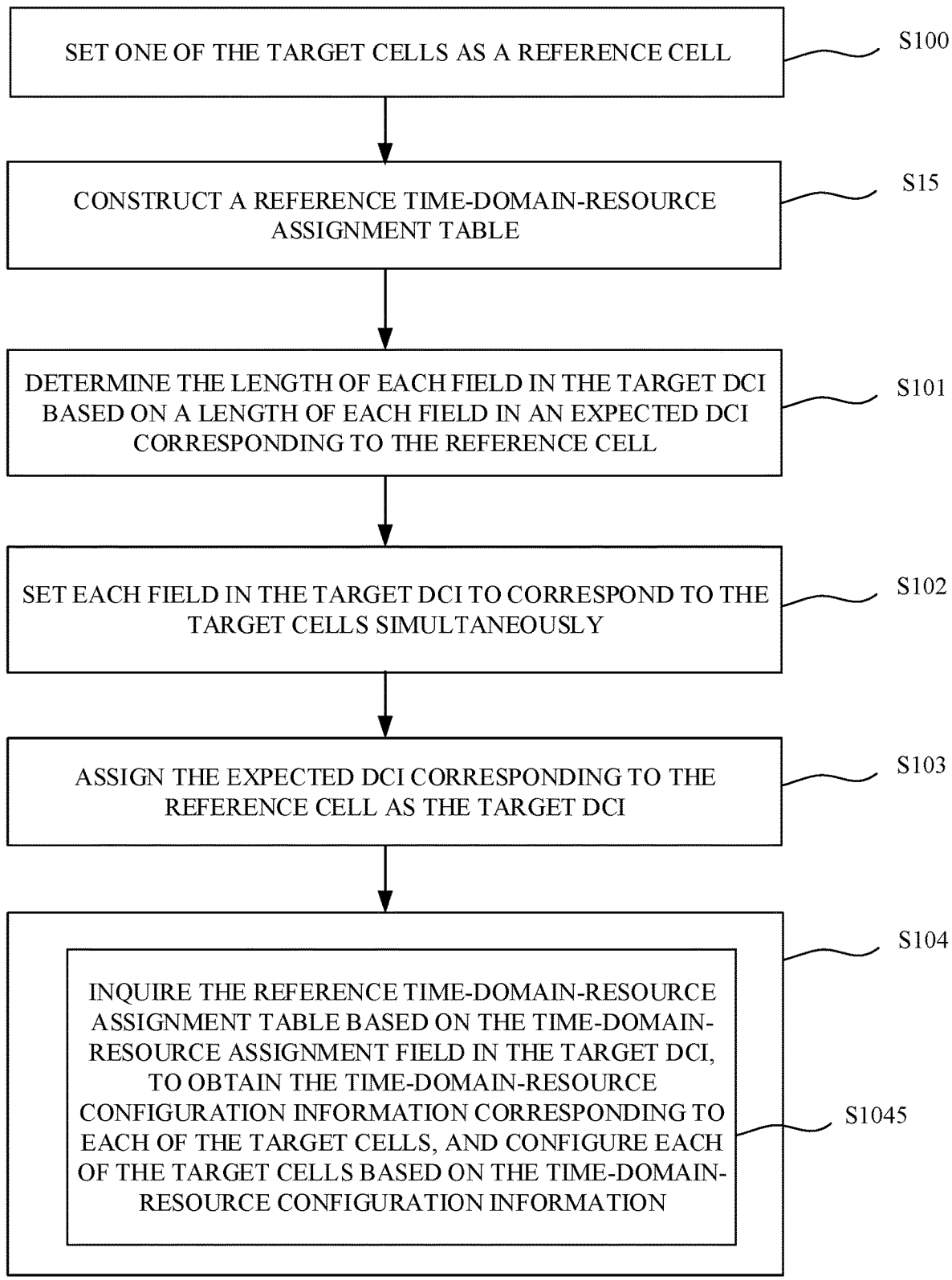
FIG. 8 is a flow chart illustrating another optional implementation of the method for generating a DCI in the embodiment 8 of the disclosure.

In another optional implementation, referring to FIG. 8, the method for scheduling a cell further includes S15. At S15, construct a reference time-domain-resource assignment table. The reference time-domain-resource assignment table contains time-domain-resource configuration information corresponding to the reference cell. S104 includes S1045. At S1045, inquire the reference time-domain-resource assignment table based on the time-domain-resource assignment field in the target DCI, to obtain the time-domain-resource configuration information, and configure each of the target cells based on the time-domain-resource configuration information.

That is, during scheduling, each of the target cells is configured based on the reference time-domain-resource assignment table.

The cell 1 is supposed to be the reference cell. FIG. 6 illustrates an optional structure of the reference time-domain-resource assignment table. The reference time-domain-resource assignment table includes a "TDRA index" column and a table block juxtaposed with the "TDRA index" column. The table block includes 3 columns, i.e., time-domain offset/SLIV/mapping type columns, where the 3 columns are respectively used to configure time-domain offset/SLIV/mapping type information for each of the cells. The number of the target cells being 2 is taken for illustration. If a value of the time-domain-resource assignment indicator field in the DCI is 0, a row where a value of the "TDRA index" is 0 is correspondingly used, and time-domain-resource information obtained by the cell 1 is that a start symbol in a next slot is 0 and a length of the next slot is 14 symbols. Similarly, a scheduling resource for the cell 2 obtained by the cell 2 is that the start symbol in the next slot for the cell 1 is 0 and the length of the next slot is 14 symbols.

Figure 9:
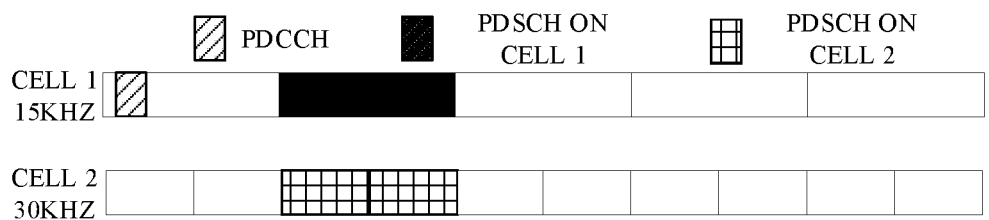
FIG. 9 is a schematic diagram illustrating cross slot for a first cell and a second cell in the method for generating a DCI in the embodiment 8 of the disclosure.

If a subcarrier spacing for the cell 1 is different from that for the cell 2 in this case, cross slot may appear. Referring to FIG. 9, in this case, for the cell 2, division on slot edges and symbols in different scheduling directions is performed. That is, for example, on a cell edge, one PDSCH originally scheduled will be automatically divided into two PDSCHs. For symbols in different scheduling directions (DL is before UL), an original PDSCH may be divided into a part in the DL and a part in part of the UL, but in the UL PDSCH transmission cannot be performed, so that PDSCH transmission is not performed.

TABLE 6

| TDRA index | K0 (DL) or K2 (UL) | SLIV | Mapping type |
| --- | --- | --- | --- |
| 0 | 1 | 27 | Type A |
| 1 | 2 | 27 | Type A |
| ... | | | |
| 15 | 1 | 78 | Type B |

In other optional implementations, the reference time-domain-resource assignment table supports at least three target cells, and each of the target cells is configured based on the time-domain-resource assignment table.

In yet another implementation, a format of rows and columns of the reference time-domain-resource assignment table is obtained through transposition based on Table 6.

Embodiment 9

Figure 10:
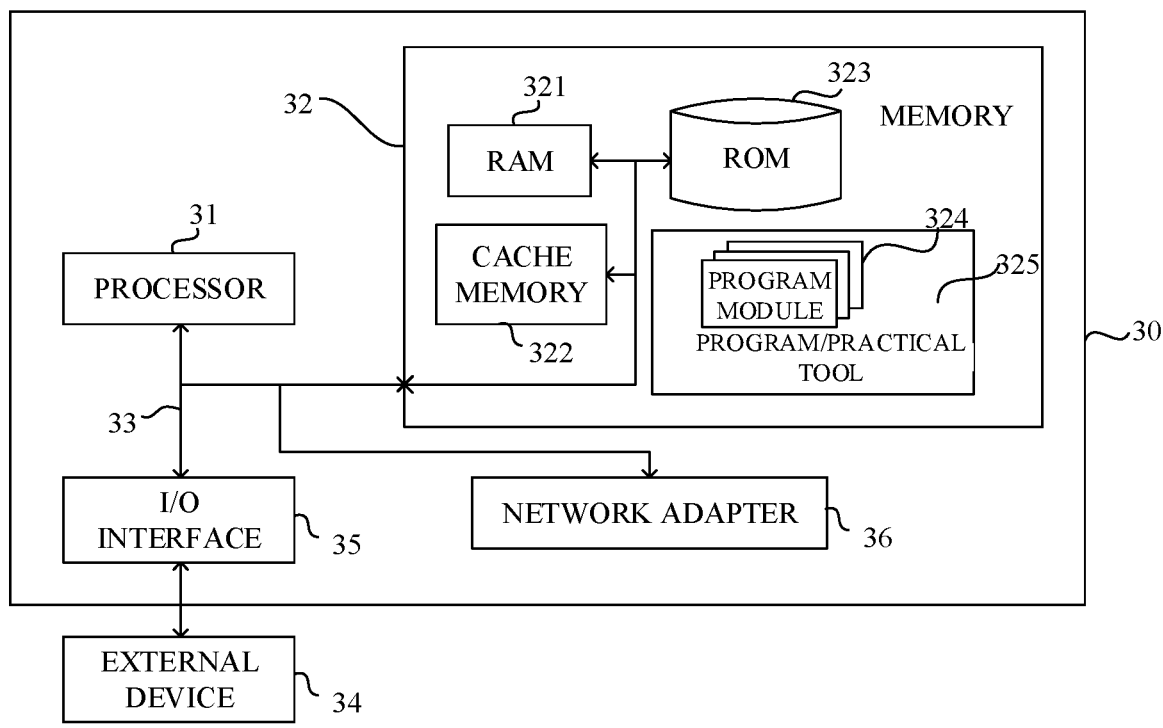
FIG. 10 is a schematic structural diagram illustrating an electronic device in embodiment 9 of the disclosure.

FIG. 10 is a schematic structural diagram illustrating an electronic device in the embodiment of the disclosure. The electronic device includes a memory, a processor, and computer programs that are stored in the memory and capable of running on the processor. In an optional implementation, the processor is configured to execute the programs to implement the method for generating a DCI in any one of embodiment 1 to embodiment 4. In another optional implementation, the processor is configured to execute the programs to implement the method for scheduling a cell in any one of embodiment 5 to embodiment 7. An electronic device 30 illustrated in FIG. 10 is only an example and may not constitute any limitation to functions and application scopes of embodiments of the disclosure.

As illustrated in FIG. 10, the electronic device 30 may be represented as a general computing device, e.g., a server device. Components of the electronic device 30 may include but are not limited to at least one processor 31, at least one memory 32, and a bus 33 coupled with different system components (including the memory 32 and the processor 31).

The bus 33 includes a data bus, an address bus, and a control bus.

The memory 32 may include a volatile memory, e.g., a random-access memory (RAM) 321 and/or a cache memory 322, and may also further include a read-only memory (ROM) 323.

The memory 32 may also include a program/practical tool 325 with a set (at least one) program module 324, where the program module 324 includes but is not limited to an operating system, one or more application programs, other program modules, and program data. Each of or a combination of these examples may include implementation of the network environment.

The processor 31 is configured to execute the computer programs stored in the memory 32 to perform various functional applications and data processing, e.g., the method for generating a DCI in any one of embodiment 1 to embodiment 4, or the method for scheduling a cell in any one of embodiment 5 to embodiment 7 in the disclosure.

The electronic device 30 can also communicate with one or more external devices 34 (for example, a keyboard, a pointing device, and so on). The communication can be implemented through an input/output (I/O) interface 35. The electronic device 30 can also communicate with one or more networks (e.g., a local area network (LAN), a wide area network (WAN), and/or a public network, e.g., an Internet) through a network adapter 36. As illustrated in FIG. 10, the network adapter 36 communicates with other modules of the electronic device 30 via the bus 33.

It can be understood that although not illustrated in the figure, other hardware and/or software modules can be used by combining the electronic device 30, including but not limited to: a micro code, a device driver, a redundant processor, an external disk drive array, a redundant array of independent disk (RAID) system, a disk drive, and a data backup storage system.

It should be noted that although several units/modules or subunits/modules of the electronic device are mentioned in the above detailed illustration, this division is only exemplary and not mandatory. Actually, based on the implementations of the disclosure, the features and functions of two or more units/modules illustrated above can be implemented in one unit/module. On the contrary, the features and functions of one unit/module illustrated above can be further divided into multiple units/modules to be implemented.

Embodiment 10

A computer-readable storage medium is provided in the embodiment. The computer-readable storage medium is configured to store computer programs which when executed by a processor, implement the operations in the method for generating a DCI in any one of embodiment 1 to embodiment 4, or the operations in the method for scheduling a cell in any one of embodiment 5 to embodiment 7.

The readable storage medium may specifically include but is not limited to a portable disk, a hard disk, an RAM, an ROM, an erasable programmable ROM (EPROM), an optical storage device, a magnetic storage device, or any suitable combination thereof.

In a possible implementation, the disclosure can also be implemented as a program product. The program product includes program codes which when executed on a terminal device, enable the terminal device to implement the operations in the method for generating a DCI in any one of embodiment 1 to embodiment 4, or the operations in the method for scheduling a cell in any one of embodiment 5 to embodiment 7.

The program codes used to execute the disclosure can be programmed through any combinations of one or more types of program design languages. The program codes can be executed completely or partially on UE, executed as a separate software packet, executed partially on the UE and partially on a remote device, or executed completely on the remote device.

Embodiment 11

Figure 11:
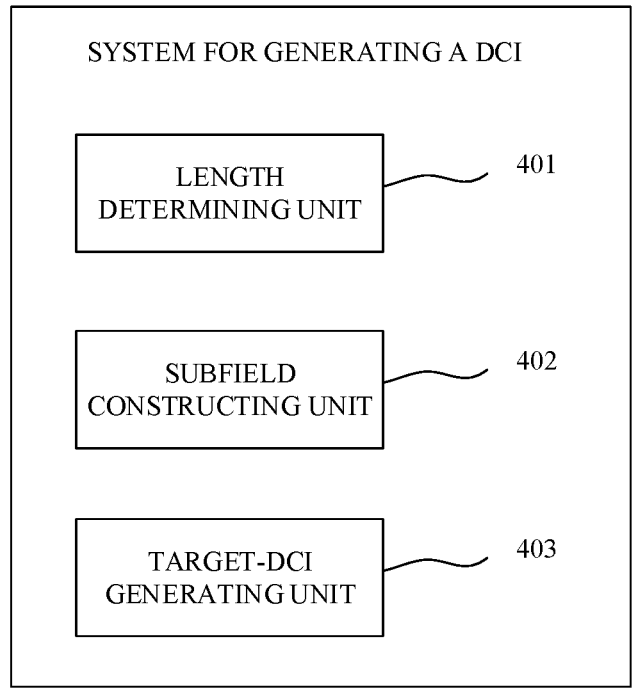
FIG. 11 is a schematic structural diagram illustrating a system for generating a DCI in embodiment 11 of the disclosure.

A system for generating a DCI is provided in the embodiment. Referring to FIG. 11, the system for generating a DCI includes a length determining unit 401, a subfield constructing unit 402, and a target-DCI generating unit 403.

The length determining unit 401 is configured to determine a length of each field in a target DCI based on a length of each field in each of expected DCIs corresponding to target cells respectively, where the number of the target cells is multiple, each of the expected DCIs is a DCI required for scheduling one of the target cells individually, and the length of each field in the target DCI is a length required to be compatible with corresponding fields in the expected DCIs. The subfield constructing unit 402 is configured to construct a subfield for each field in the target DCI based on a preset correspondence to enable each subfield of each field in the target DCI to correspond to one of the target cells. The target-DCI generating unit 403 is configured to generate each field in the target DCI based on the length of each field in the target DCI and the preset correspondence, to form the target DCI.

By determining the length of each field in the target DCI based on the length of each field in each of the expected DCIs corresponding to the target cells respectively, each field in the target DCI can has a suitable length to be compatible with corresponding fields corresponding to the cells, such that each field can contain scheduling information for the cells. That is, one DCI can be compatible with the scheduling information for the cells, thereby supporting simultaneous scheduling of the cells. During scheduling of the cells, it is only required to generate and transmit one target DCI, and only one PDSCH is occupied, thereby saving communication resources such as PDSCHs.

Embodiment 12

A system for generating a DCI is provided in the embodiment on the basis of the embodiment 11.

As a specific implementation, the length determining unit 401 is further configured to determine a length of a corresponding field in the target DCI based on a maximum value among lengths of corresponding fields in the expected DCIs.

The number of the target cells is supposed to be K. Generally, for individual scheduling of the K target cells, it needs to configure expected DCIs respectively for the K target cells. Taking a frequency-domain-resource assignment field as an example, frequency-domain-resource assignment fields in the expected DCIs each have a length corresponding to a corresponding target cell. In an optional implementation, a maximum value among the lengths is assigned as a length of a frequency-domain-resource assignment field in the target DCI. Determining manners of lengths of other fields in the target DCI are similar to the above. Accordingly, the length of the target DCI generated can be compatible with scheduling information for the target cells, thereby realizing that one target DCI contains the scheduling information for the target cells to support simultaneous scheduling of the target cells. In another optional implementation, the length of the frequency-domain-resource assignment field in the target DCI is a sum of the maximum value among the lengths and a preset bit-width value. A subfield corresponding to the preset bit-width value is used to configure resource allocation types for the target cells. Determining manners of lengths of other fields in the target DCI are similar to the above.

As an optional implementation, supposing that a length of a certain field in the target DCI is W bits, the field contains W-bit scheduling information, where the W-bit scheduling information is used to schedule the target cells. In specific implementations, the target DCI is transmitted through a preset PDCCH, where the PDCCH corresponds to the target cells. Subsequent to reception of the target DCI, the target cells respectively obtain the W-bit scheduling information in the field in the target DCI by analyzing the target DCI. In the target cells, if this field in an expected DCI corresponding to a certain target cell has Y (Y is less than or equal to W) bits, the target cell assigns lowest Y bits in the W-bit scheduling information as a subfield corresponding to the target cell to obtain corresponding scheduling information. For example, for a target cell the field corresponding to the target cell has W bits, the complete field is assigned as a subfield corresponding to the target cell to obtain corresponding scheduling information. Alternatively, for a target cell the field corresponding to the target cell has X (X is less than W) bits, lowest X bits in the field are assigned as a subfield corresponding to the target cell to obtain corresponding scheduling information. Usage of other fields in the target DCI for the target cells is similar to the above. Based on this, one target DCI can be compatible with configuration information for multiple cells.

In a first optional implementation, on condition that each of the target cells supports only resource allocation type 1, the length (the number of bits) of the frequency-domain-resource assignment field is up to a BWP for a target cell corresponding to a maximum number of physical resource blocks (PRBs) in the target cells. That is, on condition that each of the target cells supports only the resource allocation type 1, the length of the frequency-domain-resource assignment field in the target DCI is $\max(\lceil \log_2(N(n)_{RB}^{DL,BWP}(N(n)_{RB}^{DL,BWP}+1)/2) \rceil)$, where $n \in [1, K]$, and K is the number of the target cells. $N(n_{RB}^{DL,BWP}(n \in [1, K])$ respectively corresponds to each of the target cells.

In a second optional implementation, on condition that each of the target cells supports only resource allocation type 0, the length of the frequency-domain-resource assignment field is up to a BWP for a target cell corresponding to a maximum value of $N_{RBG}$ in the target cells. That is, on condition that each of the target cells supports only the resource allocation type 0, the length of the frequency-domain-resource assignment field is $\max(N(n)_{RBG})$, where $n \in [1, K]$, and K is the number of the target cells. $N(n)_{RB}^{DL,BWP} = \lceil N(n)_{RB}^{DL,BWP}/P \rceil$ ($n \in [1, K]$) respectively corresponds to each of the target cells.

In a third optional implementation, on condition that in the target cells, a part of the target cells support only the resource allocation type 0, and the other part of the target cells support only the resource allocation type 1, the length of the frequency-domain-resource assignment field is $\max(\max(\lceil \log_2(N(i)_{RB}^{DL,BWP}(N(i)_{RB}^{DL,BWP}+1)/2) \rceil), \max(N(j)_{RBG}))$, where $N(i)_{RB}^{DL,BWP}$ respectively corresponds to each of the part of the target cells supporting only the resource allocation type 0, and $N(j)_{RBG}$ respectively corresponds to each of the other part of the target cells supporting only the resource allocation type 1. As an optional implementation, in the target cells, the number of the part of the target cells supporting only the resource allocation type 0 is L, and the number of the other part of the target cells supporting only the resource allocation type 1 is M (L+M=K, K is the number of target cells expected to be scheduled, and L, M, and K are all positive integers), where $i \in [1, L]$, and $j \in [1, M]$.

In a fourth optional implementation, on condition that each of the target cells supports both the resource allocation type 0 and the resource allocation type 1, the frequency-domain-resource assignment field in the target DCI includes a type indicator bit indicative of that each of the target cells corresponds to the resource allocation type 1 or the resource allocation type 0, and the length of the frequency-domain-resource assignment field is $(\max(\max(\lceil \log_2(N(n)_{RB}^{DL,BWP}(N(n)_{RB}^{DL,BWP}+1)/2) \rceil), \max(N(n)_{RBG}))+1)$, where $n \in [1, K]$, $N(n)_{RB}^{DL,BWP}$ corresponds to a mode in which each of the target cells is indicated as the resource allocation type 1, $N(n)_{RBG}$ corresponds to a mode in which each of the target cells is indicated as the resource allocation type 0, and K is the number of the target cells. As an optional implementation, a most significant bit (MSB) of the frequency-domain-resource assignment field in the DCI is assigned as the type indicator bit. When a value of the type indicator bit is 0, each of the target cells is indicated as the resource allocation type 0. When the value of the type indicator bit is 1, each of the target cells is indicated as the resource allocation type 1.

In a fifth optional implementation, the frequency-domain-resource assignment field in the target DCI includes K type indicator bits, each of the K type indicator bits corresponds to one of the target cells and indicates that the one of the target cells corresponds to the resource allocation type 1 or the resource allocation type 0, and the length of the frequency-domain-resource assignment field is $(\max(\max(\lceil \log_2(N(n)_{RB}^{DL,BWP}(N(n)_{RB}^{DL,BWP}+1)/2) \rceil), \max(N(n)_{RBG}))+K)$, where $n \in [1, K]$, $N(n)_{RB}^{DL,BWP}$ corresponds to the mode in which each of the target cells is indicated as the resource allocation type 1, $N(n)_{RBG}$ corresponds to the mode in which each of the target cells is indicated as the resource allocation type 0, and K is the number of the target cells. As an optional implementation, each of highest K bits of the frequency-domain-resource assignment field in the DCI is the type indicator bit. An MSB of the frequency-domain-resource assignment field corresponds to a first target cell. When a value of the bit is 0, the first target cell is indicated as the resource allocation type 0. When the value of the bit is 1, the first target cell is indicated as the resource allocation type 1. If the first target cell supports only the resource allocation type 0 or the resource allocation type 1, the first target cell ignores the bit, and a resource allocation type of the first target cell is not affected by the bit. A second highest bit of the frequency-domain-resource assignment field corresponds to a second target cell. When a value of the bit is 0, the second target cell is indicated as the resource allocation type 0. When the value of the bit is 1, the second target cell is indicated as the resource allocation type 1. If the second target cell supports only the resource allocation type 0 or the resource allocation type 1, the second target cell ignores the bit, and a resource allocation type of the second target cell is not affected by the bit. Accordingly, a Kth highest bit of the frequency-domain-resource assignment field corresponds to a Kth target cell. When a value of the bit is 0, the Kth target cell is indicated as the resource allocation type 0. When the value of the bit is 1, the Kth target cell is indicated as the resource allocation type 1. If the Kth target cell supports only the resource allocation type 0 or the resource allocation type 1, the Kth target cell ignores the bit, and a resource allocation type of the Kth target cell is not affected by the bit.

By determining the length of a corresponding field in the target DCI based on the maximum value among the lengths of corresponding fields in the expected DCIs, through a relatively small length, the corresponding field in the target DCI can be compatible with all the target cells required to be scheduled, thereby saving resources.

Based on the system for generating a DCI in the embodiment, by reasonably setting the length of the target DCI and information in corresponding fields in the target DCI, one target DCI can be compatible with scheduling information for the cells, thereby supporting simultaneous scheduling of the cells. During scheduling of multiple cells, it is only required to generate and transmit one target DCI, and only one PDSCH is occupied, thereby saving communication resources such as PDSCHs.

Embodiment 13

A system for generating a DCI is provided in the embodiment on the basis of the embodiment 11. In the embodiment, as a specific implementation, the length determining unit 401 is further configured to determine a length of a corresponding field in the target DCI based on a sum of lengths of corresponding fields in the expected DCIs.

The number of the target cells is supposed to be K. Generally, for individual scheduling of the K target cells, it needs to configure expected DCIs respectively for the K target cells. Taking a frequency-domain-resource assignment field as an example, frequency-domain-resource assignment fields in the expected DCIs each have a length corresponding to a corresponding target cell. A length of a frequency-domain-resource assignment field in an expected DCI corresponding to an ith target cell is supposed to be Wi ($i \in [1, K]$).

In an optional implementation, a length of a frequency-domain-resource assignment field in the target DCI is $W = \Sigma_{i=1}^{K} W_i$. In the frequency-domain-resource assignment field, lowest W1 bits (i.e., a With bit to a first bit of the frequency-domain-resource assignment field, where the first bit is a lowest bit of the frequency-domain-resource assignment field) construct a first subfield, where the first subfield corresponds to a first target cell. W2 bits (i.e., a (W1+W2)th bit to a (W1+1)th bit of the frequency-domain-resource assignment field) adjacent to the first subfield construct a second subfield, where the second subfield corresponds to a second target cell. Accordingly, highest WK bits of the frequency-domain-resource assignment field construct a Kth subfield, where the Kth subfield corresponds to a Kth target cell. Subsequent to reception of the target DCI, each target cell parses the frequency-domain-resource assignment field in the target DCI, and obtains corresponding configuration information from a corresponding subfield in the frequency-domain-resource assignment field based on a preset correspondence. Determining manners and usage of lengths of other fields in the target DCI are similar to the above. Accordingly, the length of the target DCI generated can be compatible with scheduling information for the target cells, thereby realizing that one target DCI contains the scheduling information for the target cells to support simultaneous scheduling of the target cells.

In another optional implementation, the length of the frequency-domain-resource assignment field in the target DCI is $W = A + \Sigma_{i=1}^{K} W_i$. In the frequency-domain-resource assignment field, the lowest W1 bits (i.e., the With bit to the first bit of the frequency-domain-resource assignment field, where the first bit is the lowest bit of the frequency-domain-resource assignment field) construct the first subfield, where the first subfield corresponds to the first target cell. W2 bits (i.e., the (W1+W2)th bit to the (W1+1)th bit of the frequency-domain-resource assignment field) adjacent to the first subfield construct the second subfield, where the second subfield corresponds to the second target cell. Accordingly, a $\Sigma_{j=1}^{K} W_j$th bit to a $(1+\Sigma_{j=1}^{K-1} W_j)$th bit of the frequency-domain-resource assignment field construct a Kth subfield, where the Kth subfield corresponds to a Kth target cell. Highest A bits of the frequency-domain-resource assignment field are used to configure resource allocation types of the target cells. Determining manners and usage of lengths of other fields in the target DCI are similar to the above.

By determining the length of a corresponding field in the target DCI based on the sum of the lengths of corresponding fields in the expected DCIs, subfields respectively corresponding to the target cells can be relatively separate, such that configuration for a certain target cell may not be affected or limited by configuration for other cells, thereby having a relative high flexibility.

Based on the system for generating a DCI in the embodiment, by reasonably setting the length of the target DCI and information in corresponding fields in the target DCI, one target DCI can be compatible with scheduling information for the cells, thereby supporting simultaneous scheduling of the cells. During scheduling of multiple cells, it is only required to generate and transmit one target DCI, and only one PSCCH is occupied, thereby saving communication resources such as PSCCHs.

Embodiment 14

Figure 12:
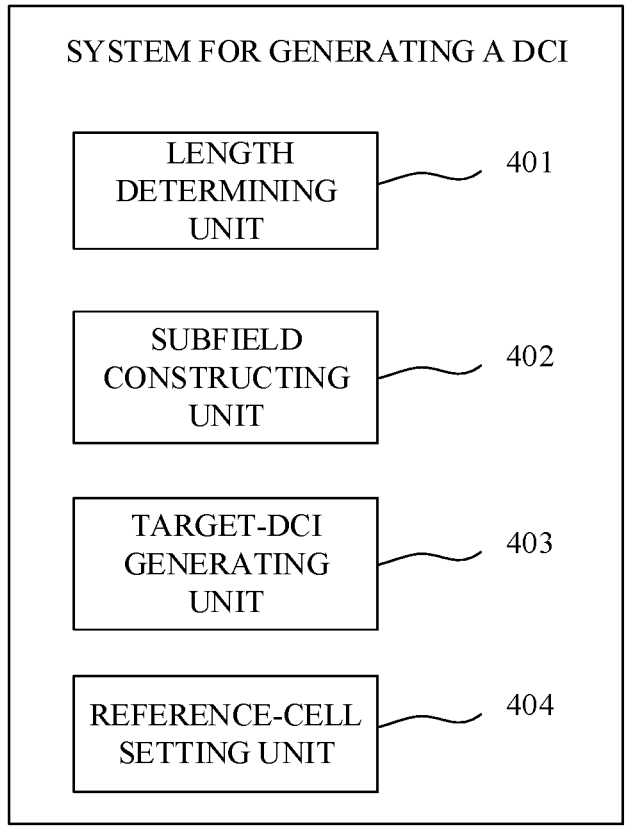
FIG. 12 is a schematic structural diagram illustrating a system for generating a DCI in embodiment 14 of the disclosure.

A system for generating a DCI is provided in the embodiment on the basis of the embodiment 11. Referring to FIG. 12, the system for generating a DCI further includes a reference-cell setting unit 404. The reference-cell setting unit 404 is configured to set one of the target cells as a reference cell. The length determining unit 401 is configured to determine the length of each field in the target DCI based on a length of each field in an expected DCI corresponding to the reference cell. The subfield constructing unit 402 is configured to set each field in the target DCI to correspond to the target cells simultaneously. The target-DCI generating unit 403 is configured to assign the expected DCI corresponding to the reference cell as the target DCI. That is, during scheduling of the target cells, each of other target cells except for the reference cell adopts the same configuration as the reference cell.

In specific implementations, the target DCI (i.e., the expected DCI corresponding to the reference cell) is transmitted through a preset PDCCH, where the PDCCH corresponds to the target cells. Subsequent to reception of the target DCI, the target cells can obtain corresponding scheduling information by analyzing the target DCI. Based on the system for generating a DCI in the implementation, one DCI can be compatible with scheduling information for multiple cells, thereby supporting simultaneous scheduling of the multiple cells. During scheduling of multiple cells, it is only required to generate and transmit one target DCI, and only one PDSCH is occupied, thereby saving communication resources such as PDSCHs.

Embodiment 15

Figure 13:
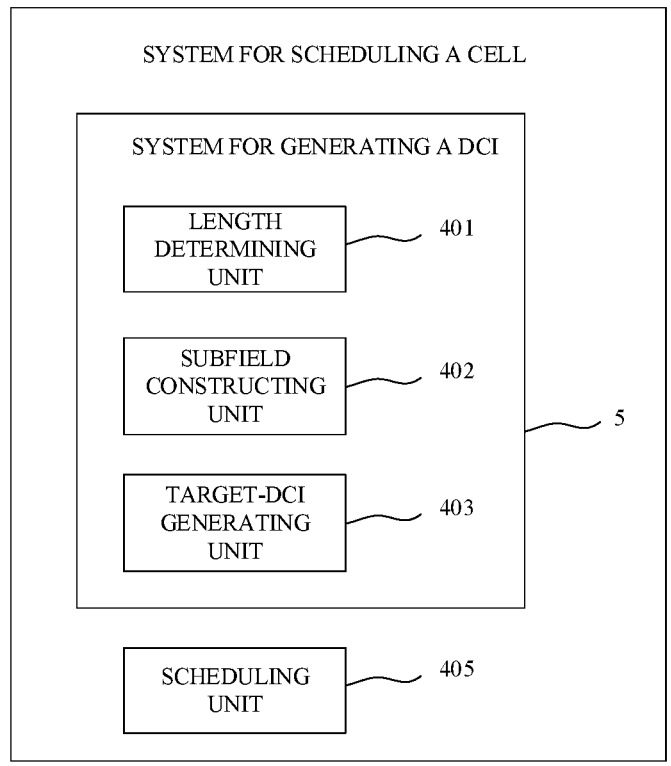
FIG. 13 is a schematic structural diagram illustrating a system for scheduling a cell in embodiment 15 of the disclosure.

A system for scheduling a cell is provided in the embodiment. Referring to FIG. 13, the system for scheduling a cell includes a scheduling unit 405 and the system for generating a DCI 5 in any one of the embodiments 11 to 13.

The system 5 for generating a DCI is configured to generate the target DCI. The scheduling unit 405 is configured to schedule the target cells based on the target DCI.

The target DCI can be compatible with the scheduling information for the target cells, thereby supporting simultaneous scheduling of the target cells through one target DCI. By scheduling the target cells based on the target DCI, only one PDSCH is occupied, thereby saving communication resources such as PDSCHs.

Embodiment 16

Figure 14:
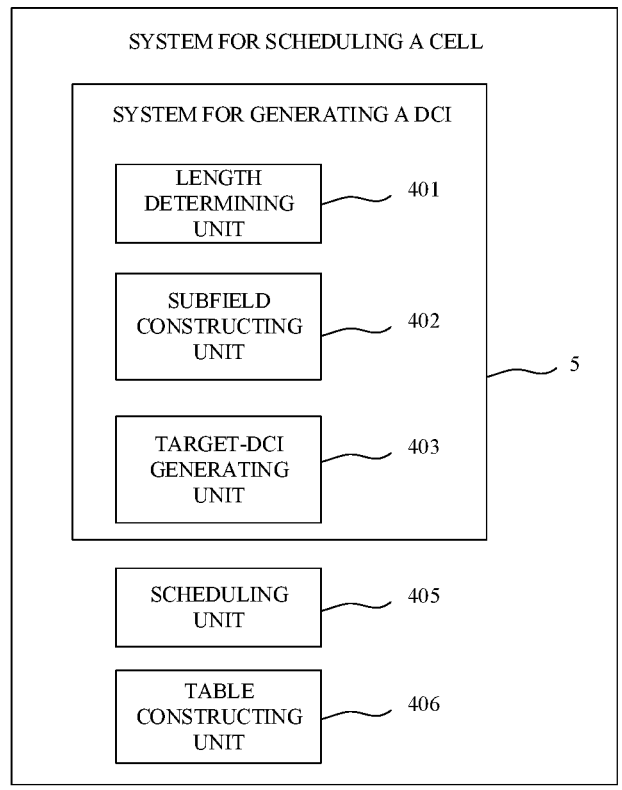
FIG. 14 is a schematic structural diagram illustrating a system for scheduling a cell in embodiment 16 of the disclosure.

A system for scheduling a cell is provided in the embodiment on the basis of the embodiment 15. Referring to FIG. 14, the system for scheduling a cell includes a table constructing unit 406. The table constructing unit 406 is configured to construct a BWP configuration table, where the BWP configuration table contains BWP configuration information corresponding to each of the target cells. The scheduling unit 405 is further configured to inquire the BWP configuration table based on a BWP indicator field in the target DCI, to obtain the BWP configuration information corresponding to each of the target cells, and configure a corresponding target cell based on the BWP configuration information.

In a first optional implementation, the BWP configuration table is configured by higher-layer signaling (RRC signaling). The number of the target cells being 2 is taken as an example. Referring to Table 1, a first column of the BWP configuration table is an index column, a second column contains BWP configuration information corresponding to cell 1, and a third column contains BWP configuration information corresponding to cell 2. When a value of the BWP indicator field of the DCI is 1, a row where a value of the BWP configuration index is 1 in the BWP configuration table is correspondingly used, such that the BWP configuration information corresponding to the cell 1 is 1, and the BWP configuration information corresponding to the cell 2 is 1. The cell 1 and the cell 2 perform BWP switching based on their respective BWP configuration information. Specific meaning of the BWP configuration information is known by those skilled in the art, which will not be repeated herein.

In other optional implementations, the BWP configuration table supports at least three target cells, and the number of columns of the BWP configuration table is suited to the number of the target cells.

In another optional implementation, a format of rows and columns of the BWP configuration table adopted is obtained through transposition based on Table 1.

In a second optional implementation, for improving efficiency of BWP switching, the BWP configuration information includes an activation mode, where the activation mode is indicative of that a corresponding target cell maintains a current BWP. Referring to Table 2, the activation mode is represented with "active BWP", representing that performing no BWP switching and the current BWP is still used. Benefits of the activation mode lie in that a PDCCH on a single cell can be used to perform BWP switching for the single cell, and scheduling for a part or all of PDCCHs on multiple cells is performed based on the current BWP without further active BWP adjustment, thereby facilitating to improving efficiency of BWP switching. Based on Table 2, when the value of the BWP indicator field of the DCI is 1, the row where the value of the BWP configuration index is 1 in the BWP configuration table is correspondingly used, and thus the BWP configuration information corresponding to the cell 1 is "active BWP", and the cell 1 still uses the current BWP; the BWP configuration information corresponding to the cell 2 is 1, and the cell 2 performs BWP switching based on the BWP configuration information corresponding to the cell 2.

In other optional implementations, the BWP configuration table supports at least three target cells, and the number of columns of the BWP configuration table is suited to the number of the target cells.

In another optional implementation, a format of rows and columns of the BWP configuration table adopted is obtained through transposition based on Table 2.

By setting the BWP configuration table, when multiple cells are scheduled based on the system for scheduling a cell in the implementation, BWPs for the cells can be simultaneously configured, improving efficiency.

Embodiment 17

A system for scheduling a cell is provided in the embodiment on the basis of the embodiment 15. Referring to FIG. 14, the system for scheduling a cell includes a table constructing unit 406. In an optional implementation, the table constructing unit 406 is configured to construct a time-domain-resource assignment table. The time-domain-resource assignment table contains time-domain-resource configuration information corresponding to each of the target cells. The scheduling unit 405 is further configured to inquire the time-domain-resource assignment table based on a time-domain-resource assignment field in the target DCI, to obtain the time-domain-resource configuration information corresponding to each of the target cells, and configure a corresponding target cell based on the time-domain-resource configuration information.

In a first optional implementation, the time-domain-resource assignment table includes an index block and multiple table blocks, each of the multiple table blocks corresponds to one of the target cells, and each element in the index block is used to index simultaneously corresponding elements in the multiple table blocks, to obtain the time-domain-resource configuration information. The scheduling unit 405 is configured to index simultaneously corresponding elements in the multiple table blocks based on an element corresponding to the time-domain-resource assignment field in the index block, to obtain the time-domain-resource configuration information.

Specifically referring to Table 3, the time-domain-resource assignment table is a single table. "TDRA index" column in the time-domain-resource assignment table is assigned as the index block. A second column to a fifth column of the time-domain-resource assignment table construct a first table block, where the first table block corresponds to the cell 1. The second column, i.e., "K0 (DL) or K2 (UL) (time-domain offset) for cell 1" column, includes time-domain offset information, "SLIV for cell 1" column includes SLIV configuration information, "mapping type for cell 1" column includes mapping type configuration information, and "repetition for cell 1" column includes retransmission configuration information. A sixth column to a ninth column of the time-domain-resource assignment table construct a second table block, where the second table block corresponds to the cell 2. A structure of the second table block is similar to that of the first table block.

Values in the "TDRA index" column are respectively 0, 1, 2, . . . , 15. The value of the TDRA index and values of corresponding time-domain offset/SLIV/mapping type/repetition are similar to those in the related art, such that several behavior illustration is omitted in Table 3.

Subsequent to generation of the target DCI, obtain time-domain-resource configuration information corresponding to each of the target cells by inquiring the time-domain-resource assignment table based on a value of the time-domain-resource assignment field in the target DCI (corresponding to a value of the TDRA index). For example, if the value of the time-domain-resource assignment field in the target DCI is 1, obtain the time-domain-resource configuration information corresponding to each of the target cells based on a row where the value of the TDRA index is 1 in the time-domain-resource assignment table.

In other optional implementations, the time-domain-resource assignment table supports at least three target cells, and the number of table blocks in the time-domain-resource assignment table is suited to the number of the target cells.

In another optional implementation, a format of rows and columns of the time-domain-resource assignment table adopted is obtained through transposition based on Table 3.

In a second optional implementation, the time-domain-resource assignment table includes multiple sub-tables, each of the multiple sub-tables includes an index block and a table block, each table block corresponds to one of the target cells, and each element in the index block is used to index corresponding elements in a corresponding table block, to obtain the time-domain-resource configuration information. The scheduling unit 405 is configured to index corresponding elements in the table block based on an element corresponding to the time-domain-resource assignment field in the index block, to obtain the time-domain-resource configuration information corresponding to each of the target cells.

When the number of the target cells is 2, the time-domain-resource assignment table includes 2 sub-tables. For the 2 sub-tables, reference can be made to Table 4 and Table 5 respectively, where a first sub-table (Table 4) corresponds to the cell 1, and a second sub-table (Table 5) corresponds to the cell 2.

In the first sub-table, "TDRA index" column is assigned as the index block, and a second column to a fourth column construct a first table block, where the first table block corresponds to the cell 1. The second column, i.e., "K0 (DL) or K2 (UL) (time-domain offset)" column, includes time-domain offset information, "SLIV" column includes SLIV configuration information, "mapping type" column includes mapping type configuration information, and "repetition for cell 1" column includes retransmission configuration information. The first table block includes 4 columns, i.e., time-domain offset/SLIV/mapping type/repetition columns, where the 4 columns are respectively used to configure time-domain offset/SLIV/mapping type/repetition information for the cell 1. A structure of the second sub-table is similar to that of the first sub-table, "TDRA index" column is assigned as the index block, and a second column to a fourth column construct a second table block, where the second table block corresponds to the cell 2.

Subsequent to generation of the target DCI, obtain the time-domain-resource configuration information corresponding to a cell by inquiring each of the multiple sub-tables based on the value of the time-domain-resource assignment field in the target DCI (corresponding to a value of the TDRA index). For example, if the value of the time-domain-resource assignment field in the target DCI is 1, obtain time-domain-resource configuration information corresponding to the cell 1 based on a row where the value of the TDRA index is 1 in the first sub-table, and obtain time-domain-resource configuration information corresponding to the cell 2 based on a row where the value of the TDRA index is 1 in the second sub-table.

In other optional implementations, the time-domain-resource assignment table supports at least three target cells, and the number of sub-tables in the time-domain-resource assignment table is suited to the number of the target cells.

In another optional implementation, a format of rows and columns of sub-tables of the time-domain-resource assignment table is obtained through transposition based on Table 4 and Table 5.

Values in the "TDRA index" column are respectively 0, 1, 2, . . . , 15. The value of the TDRA index and values of time-domain offset/SLIV/mapping type are similar to those in the related art, such that several behavior illustration is omitted in Table 4 and Table 5.

In another optional implementation, the table constructing unit 406 is configured to construct the time-domain-resource assignment table and the BWP configuration table. The scheduling unit 405 is further configured to inquire the time-domain-resource assignment table based on the time-domain-resource assignment field in the target DCI, to obtain the time-domain-resource configuration information corresponding to each of the target cells, inquire the BWP table based on the BWP indicator field in the target DCI, to obtain BWP configuration information corresponding to each of the target cells, and configure a corresponding target cell based on the BWP configuration information and the time-domain-resource configuration information.

Based on the system for scheduling a cell in the embodiment, by improving the time-domain-resource assignment table, simultaneous scheduling of multiple cells can be realized through one DCI, saving communication resources such as PDSCHs.

Embodiment 18

Figure 15:
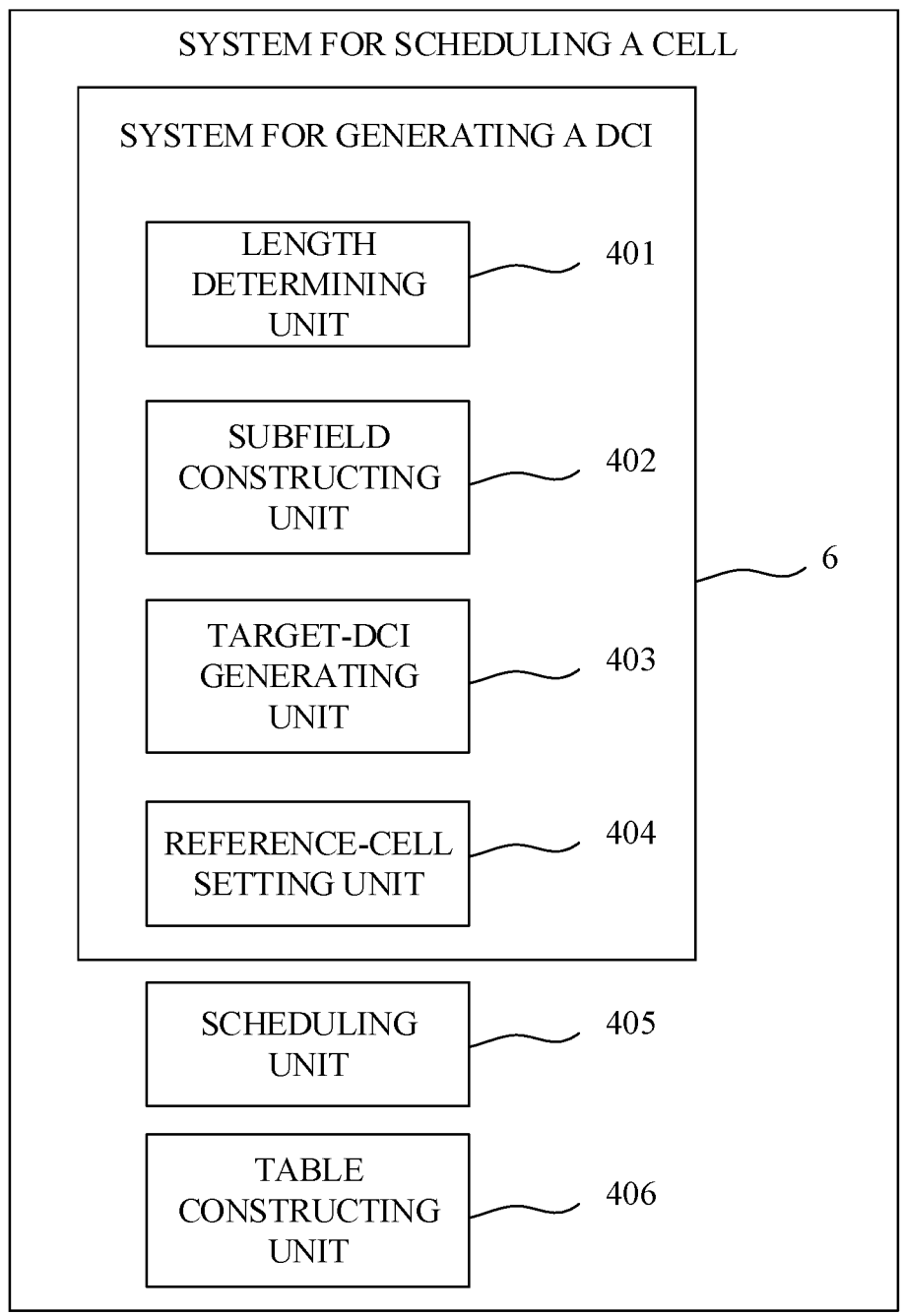
FIG. 15 is a schematic structural diagram illustrating a system for scheduling a cell in embodiment 18 of the disclosure.

A system for scheduling a cell is provided in the embodiment. Referring to FIG. 15, the system for scheduling a cell includes the scheduling unit 405 and the system for generating a DCI 6 in the embodiment 14. The system 6 for generating a DCI is configured to generate the target DCI. The scheduling unit 405 is configured to schedule the target cells based on the target DCI.

In an optional implementation, the system for scheduling a cell further includes a table constructing unit 406. The table constructing unit 406 is configured to construct a reference time-domain-resource assignment table, where the reference time-domain-resource assignment table contains time-domain-resource configuration information corresponding to the reference cell. The scheduling unit 405 is further configured to inquire the reference time-domain-resource assignment table based on the time-domain-resource assignment field in the target DCI, to obtain the time-domain-resource configuration information, and configure each of the target cells based on the time-domain-resource configuration information.

The cell 1 is supposed to be the reference cell. FIG. 6 illustrates an optional structure of the reference time-domain-resource assignment table. The reference time-domain-resource assignment table includes a "TDRA index" column and a table block juxtaposed with the "TDRA index" column. The table block includes 3 columns, i.e., time-domain offset/SLIV/mapping type columns, where the 3 columns are respectively used to configure time-domain offset/SLIV/mapping type information for each of the cells. The number of the target cells being 2 is taken for illustration. If a value of a time-domain-resource assignment indicator field in the DCI is 0, a row where a value of the "TDRA index" is 0 is correspondingly used, and time-domain-resource information obtained by the cell 1 is that a start symbol in a next slot is 0 and a length of the next slot is 14 symbols. Similarly, a scheduling resource for the cell 2 obtained by the cell 2 is that the start symbol in the next slot for the cell 1 is 0 and the length of the next slot is 14 symbols. If a subcarrier spacing for the cell 1 is different from that for the cell 2 in this case, cross slot may appear. Referring to FIG. 9, in this case, for the cell 2, division on slot edges and symbols in different scheduling directions is performed. That is, for example, on a cell edge, one PDSCH originally scheduled will be automatically divided into two PDSCHs. For symbols in different scheduling directions (DL is in front, and UL is in back), an original PDSCH may be divided into a part in the DL and a part in part of the UL, but in the UL the PDSCH transmission cannot be performed, so that PDSCH transmission is not performed.

In other optional implementations, the reference time-domain-resource assignment table supports at least three target cells, and each of the target cells is configured based on the time-domain-resource assignment table.

In yet another implementation, a format of rows and columns of the reference time-domain-resource assignment table is obtained through transposition based on Table 6.

Although the specific implementations of the disclosure have been illustrated above, those skilled in the art should understand that this is only an example, and the scope of protection of the disclosure is defined by the appended claims. Those skilled in the art can make many changes or modifications to these implementations without departing from the principle and essence of the disclosure, but these changes and modifications all fall within the scope of protection of the disclosure.

What is claimed is:

1. A method for generating a downlink control information (DCI), comprising:
    determining a length of each field in a target DCI based on a length of each field in each of expected DCIs corresponding to target cells respectively, each of the expected DCIs being a DCI required for scheduling one of the target cells individually, and the length of each field in the target DCI being a length required to be compatible with corresponding fields in the expected DCIs;
    constructing a subfield for each field in the target DCI based on a preset correspondence to enable each subfield of each field in the target DCI to correspond to one of the target cells; and
    generating each field in the target DCI based on the length of each field in the target DCI and the preset correspondence, to form the target DCI.

2. The method of claim 1, wherein determining the length of each field in the target DCI based on the length of each field in each of the expected DCIs corresponding to the target cells respectively comprises:
    determining a length of a corresponding field in the target DCI based on a maximum value among lengths of corresponding fields in the expected DCIs.

3. The method of claim 2, wherein
    on condition that each of the target cells supports only resource allocation type 1, a length of a frequency-domain-resource assignment field in the target DCI is $\max(\lceil \log_2(N(n)_{RB}^{DL,BWP}(N(n)_{RB}^{DL,BWP}+1)/2) \rceil)$, wherein $n \in [1, K]$, and K is the number of the target cells;
    on condition that each of the target cells supports only resource allocation type 0, the length of the frequency-domain-resource assignment field in the target DCI is $\max(N(n)_{RBG})$, wherein $n \in [1, K]$, and K is the number of the target cells;
    on condition that in the target cells, a part of the target cells support only the resource allocation type 0, and the other part of the target cells support only the resource allocation type 1, the length of the frequency-domain-resource assignment field in the target DCI is $\max(\max(\lceil \log_2(N(i)_{RB}^{DL,BWP}(N(i)_{RB}^{DL,BWP}+1)/2) \rceil), \max(N(j)_{RBG}))$, wherein $i \in [1, L]$, $j \in [1, M]$, L is number of target cells supporting only the resource allocation type 1, M is number of target cells supporting only the resource allocation type 0, L+M=K, and K is the number of the target cells;
    on condition that each of the target cells supports both the resource allocation type 0 and the resource allocation type 1, the frequency-domain-resource assignment field in the target DCI comprises a type indicator bit indicative of that each of the target cells corresponds to the resource allocation type 1 or the resource allocation type 0, and the length of the frequency-domain-resource assignment field is $(\max(\max(\lceil \log_2(N(n)_{RB}^{DL,BWP}(N(n)_{RB}^{DL,BWP}+1)/2) \rceil), \max(N(n)_{RBG}))+1)$, wherein $n \in [1, K]$, $N(n)_{RB}^{DL,BWP}$ corresponds to a mode in which each of the target cells is indicated as the resource allocation type 1, $N(n)_{RBG}$ corresponds to a mode in which each of the target cells is indicated as the resource allocation type 0, and K is the number of the target cells; or
    the frequency-domain-resource assignment field in the target DCI comprises K type indicator bits, each of the K type indicator bits corresponds to one of the target cells and indicates that the one of the target cells corresponds to the resource allocation type 1 or the resource allocation type 0, and the length of the frequency-domain-resource assignment field is $(\max(\max(\lceil \log_2(N(n)_{RB}^{DL,BWP}(N(n)_{RB}^{DL,BWP}+1)/2) \rceil), \max(N(n)_{RBG}))+K)$, wherein $n \in [1, K]$, $N(n)_{RB}^{DL,BWP}$ corresponds to the mode in which each of the target cells is indicated as the resource allocation type 1, $N(n)_{RBG}$ corresponds to the mode in which each of the target cells is indicated as the resource allocation type 0, and K is the number of the target cells.

4. The method of claim 1, wherein determining the length of each field in the target DCI based on the length of each field in each of the expected DCIs corresponding to the target cells respectively comprises:
    determining a length of a corresponding field in the target DCI based on a sum of lengths of corresponding fields in the expected DCIs.

5. The method of claim 1, further comprising:
    setting one of the target cells as a reference cell, wherein determining the length of each field in the target DCI based on the length of each field in each of the expected DCIs corresponding to the target cells respectively comprises:
        determining the length of each field in the target DCI based on a length of each field in an expected DCI corresponding to the reference cell;
    constructing the subfield for each field in the target DCI based on the preset correspondence comprises:
        setting each field in the target DCI to correspond to the target cells simultaneously; and generating each field in the target DCI based on the length of each field in the target DCI and the preset correspondence to form the target DCI comprises:
assigning the expected DCI corresponding to the reference cell as the target DCI.

6. A method for scheduling a cell, comprising:
determining a length of each field in a target DCI based on a length of each field in each of expected DCIs corresponding to target cells respectively, each of the expected DCIs being a DCI required for scheduling one of the target cells individually, and the length of each field in the target DCI being a length required to be compatible with corresponding fields in the expected DCIs;
constructing a subfield for each field in the target DCI based on a preset correspondence to enable each subfield of each field in the target DCI to correspond to one of the target cells;
generating each field in the target DCI based on the length of each field in the target DCI and the preset correspondence, to generate the target DCI; and
scheduling the target cells based on the target DCI.

7. The method of claim 6, further comprising:
constructing a bandwidth part (BWP) configuration table, wherein the BWP configuration table contains BWP configuration information corresponding to each of the target cells; wherein
scheduling the target cells based on the target DCI comprises:
inquiring the BWP configuration table based on a BWP indicator field in the target DCI, to obtain the BWP configuration information corresponding to each of the target cells; and
configuring a corresponding target cell based on the BWP configuration information; and/or
the method further comprising: constructing a time-domain-resource assignment table, wherein the time-domain-resource assignment table contains time-domain-resource configuration information corresponding to each of the target cells; wherein
scheduling the target cells based on the target DCI comprises:
inquiring the time-domain-resource assignment table based on a time-domain-resource assignment field in the target DCI, to obtain the time-domain-resource configuration information corresponding to each of the target cells; and
configuring a corresponding target cell based on the time-domain-resource configuration information.

8. The method of claim 7, wherein on condition that the method comprises constructing the BWP configuration table, the BWP configuration information comprises an activation mode, wherein the activation mode is indicative of that the target cells maintain a current BWP.

9. The method of claim 7, wherein on condition that the method comprises constructing the time-domain-resource assignment table,
the time-domain-resource assignment table comprises an index block and a plurality of table blocks, each of the plurality of table blocks corresponds to one of the target cells, and each element in the index block is used to index simultaneously corresponding elements in the plurality of table blocks, to obtain the time-domain-resource configuration information, wherein inquiring the time-domain-resource assignment table based on the time-domain-resource assignment field in the target DCI, to obtain the time-domain-resource configuration information corresponding to each of the target cells comprises: indexing simultaneously corresponding elements in the plurality of table blocks based on an element corresponding to the time-domain-resource assignment field in the index block, to obtain the time-domain-resource configuration information; or
the time-domain-resource assignment table comprises a plurality of sub-tables, each of the plurality of sub-tables comprises an index block and a table block, each table block corresponds to one of the target cells, and each element in the index block is used to index corresponding elements in a corresponding table block, to obtain the time-domain-resource configuration information, wherein inquiring the time-domain-resource assignment table based on the time-domain-resource assignment field in the target DCI, to obtain the time-domain-resource configuration information corresponding to each of the target cells comprises: indexing corresponding elements in the table block based on an element corresponding to the time-domain-resource assignment field in the index block, to obtain the time-domain-resource configuration information corresponding to each of the target cells.

10. The method of claim 6, further comprising:
constructing a reference time-domain-resource assignment table, wherein the reference time-domain-resource assignment table contains time-domain-resource configuration information corresponding to a reference cell, wherein the reference cell is one of the target cells, and an expected DCI corresponding to the reference cell is assigned as the target DCI, wherein
scheduling the target cells based on the target DCI comprises:
inquiring the reference time-domain-resource assignment table based on a time-domain-resource assignment field in the target DCI, to obtain the time-domain-resource configuration information; and
configuring each of the target cells based on the time-domain-resource configuration information.

11. An electronic device, comprising:
a memory;
a processor; and
computer programs stored in the memory and capable of running on the processor;
the computer programs being executed by the processor to cause the processor to:
determine a length of each field in a target DCI based on a length of each field in each of expected DCIs corresponding to target cells respectively, each of the expected DCIs being a DCI required for scheduling one of the target cells individually, and the length of each field in the target DCI being a length required to be compatible with corresponding fields in the expected DCIs;
construct a subfield for each field in the target DCI based on a preset correspondence to enable each subfield of each field in the target DCI to correspond to one of the target cells;
generate each field in the target DCI based on the length of each field in the target DCI and the preset correspondence, to form the target DCI.

12. The electronic device of claim 11, wherein the computer programs executed by the processor to determine the length of each field in the target DCI causes the processor to:
determine a length of a corresponding field in the target DCI based on a maximum value among lengths of corresponding fields in the expected DCIs.

13. The electronic device of claim 12, wherein
on condition that each of the target cells supports only resource allocation type 1, a length of a frequency-domain-resource assignment field in the target DCI is $\max(\lceil \log_2(N(n)_{RB}^{DL,BWP}(N(n)_{RB}^{DL,BWP}1)/2)\rceil)$, wherein $n\in[1, K]$, and K is the number of the target cells;
on condition that each of the target cells supports only resource allocation type 0, the length of the frequency-domain-resource assignment field in the target DCI is $\max(N(n)_{RBG})$, wherein $n\in[1, K]$, and K is the number of the target cells;
on condition that in the target cells, a part of the target cells support only the resource allocation type 0, and the other part of the target cells support only the resource allocation type 1, the length of the frequency-domain-resource assignment field in the target DCI is $\max(\max(\lceil\log_2(N(i)_{RB}^{DL,BWP}(N(i)_{RB}^{DL,BWP}+1)/2)\rceil)$, $\max(N(j)_{RBG}))$, wherein $i\in[1, L]$, $j\in[1, M]$, L is number of target cells supporting only the resource allocation type 1, M is number of target cells supporting only the resource allocation type 0, L+M=K, and K is the number of the target cells;
on condition that each of the target cells supports both the resource allocation type 0 and the resource allocation type 1, the frequency-domain-resource assignment field in the target DCI comprises a type indicator bit indicative of that each of the target cells corresponds to the resource allocation type 1 or the resource allocation type 0, and the length of the frequency-domain-resource assignment field is $(\max(\max(\lceil\log_2(N(n)_{RB}^{DL,BWP}(N(n)_{RB}^{DL,BWP}+1)/2)\rceil)$, $\max(N(n)_{RBG}))+1)$, wherein $n\in[1, K]$, $N(n)_{RB}^{DL,BWP}$ corresponds to a mode in which each of the target cells is indicated as the resource allocation type 1, $N(n)_{RBG}$ corresponds to a mode in which each of the target cells is indicated as the resource allocation type 0, and K is the number of the target cells; or
the frequency-domain-resource assignment field in the target DCI comprises K type indicator bits, each of the K type indicator bits corresponds to one of the target cells and indicates that the one of the target cells corresponds to the resource allocation type 1 or the resource allocation type 0, and the length of the frequency-domain-resource assignment field is $(\max(\max(\lceil\log_2(N(n)_{RB}^{DL,BWP}(N(n)_{RB}^{DL,BWP}+1)/2)\rceil)$, $\max(N(n)_{RBG}))+K)$, wherein $n\in[1, K]$, $N(n)_{RB}^{DL,BWP}$ corresponds to the mode in which each of the target cells is indicated as the resource allocation type 1, $N(n)_{RBG}$ corresponds to the mode in which each of the target cells is indicated as the resource allocation type 0, and K is the number of the target cells.

14. The electronic device of claim 11, wherein the computer programs executed by the processor to determine the length of each field in the target DCI causes the processor to:
determine a length of a corresponding field in the target DCI based on a sum of lengths of corresponding fields in the expected DCIs.

15. The electronic device of claim 11, wherein the computer programs are further executed by the processor to cause the processor to:
set one of the target cells as a reference cell, wherein
the computer programs executed by the processor to determine the length of each field in the target DCI causes the processor to:
determine the length of each field in the target DCI based on a length of each field in an expected DCI corresponding to the reference cell;
the computer programs executed by the processor to construct the subfield for each field in the target DCI based on the preset correspondence causes the processor to:
set each field in the target DCI to correspond to the target cells simultaneously; and
the computer programs executed by the processor to generate each field in the target DCI based on the length of each field in the target DCI and the preset correspondence to generate the target DCI causes the processor to:
assign the expected DCI corresponding to the reference cell as the target DCI.

16. The electronic device of claim 11, wherein the computer programs are further executed by the processor to cause the processor to:
schedule the target cells based on the target DCI.

17. The electronic device of claim 16, wherein
the computer programs are further executed by the processor to construct a bandwidth part (BWP) configuration table, wherein the BWP configuration table contains BWP configuration information corresponding to each of the target cells; wherein the computer programs executed by the processor to schedule the target cells based on the target DCI causes the processor to: inquire the BWP configuration table based on a BWP indicator field in the target DCI, to obtain the BWP configuration information corresponding to each of the target cells; and configure a corresponding target cell based on the BWP configuration information; and/or
the computer programs are further executed by the processor to construct a time-domain-resource assignment table, wherein the time-domain-resource assignment table contains time-domain-resource configuration information corresponding to each of the target cells; wherein the computer programs executed by the processor to schedule the target cells based on the target DCI causes the processor to: inquire the time-domain-resource assignment table based on a time-domain-resource assignment field in the target DCI, to obtain the time-domain-resource configuration information corresponding to each of the target cells; and configure a corresponding target cell based on the time-domain-resource configuration information.

18. The electronic device of claim 17, wherein on condition that the BWP configuration table is constructed, the BWP configuration information comprises an activation mode, wherein the activation mode is indicative of that the target cells maintain a current BWP.

19. The electronic device of claim 17, wherein on condition that the time-domain-resource assignment table is constructed,
the time-domain-resource assignment table comprises an index block and a plurality of table blocks, each of the plurality of table blocks corresponds to one of the target cells, and each element in the index block is used to index simultaneously corresponding elements in the plurality of table blocks, to obtain the time-domain-resource configuration information, wherein the computer programs executed by the processor to schedule the target cells based on the target DCI causes the processor to index simultaneously corresponding elements in the plurality of table blocks based on an element corresponding to the time-domain-resource assignment field in the index block, to obtain the time-domain-resource configuration information; or the time-domain-resource assignment table comprises a plurality of sub-tables, each of the plurality of sub-tables comprises an index block and a table block, each table block corresponds to one of the target cells, and each element in the index block is used to index corresponding elements in a corresponding table block, to obtain the time-domain-resource configuration information, wherein the computer programs executed by the processor to schedule the target cells based on the target DCI causes the processor to index corresponding elements in the table block based on an element corresponding to the time-domain-resource assignment field in the index block, to obtain the time-domain-resource configuration information corresponding to each of the target cells.

20. The electronic device of claim 11, wherein
the computer programs are executed by the processor to cause the processor to construct a reference time-domain-resource assignment table, wherein the reference time-domain-resource assignment table contains time-domain-resource configuration information corresponding to a reference cell, wherein the reference cell is one of the target cells, and an expected DCI corresponding to the reference cell is assigned as the target DCI; and
the computer programs are further executed by the processor to cause the processor to:
  inquire the reference time-domain-resource assignment table based on a time-domain-resource assignment field in the target DCI, to obtain the time-domain-resource configuration information; and
  configure each of the target cells based on the time-domain-resource configuration information.

* * * * *